United States Patent
Buechler et al.

(10) Patent No.: US 10,563,068 B2
(45) Date of Patent: Feb. 18, 2020

(54) POROUS POLYMER COATINGS

(71) Applicant: Precision Fabrics Group, Inc., Greensboro, NC (US)

(72) Inventors: Troy Raymond Buechler, Salisbury, NC (US); William C. Wiese, Westfield, NC (US); Samuel Mark Gillette, Burlington, NC (US)

(73) Assignee: Precision Fabrics Group, Inc., Greensboro, NC (US)

( * ) Notice: Subject to any disclaimer, the term of this patent is extended or adjusted under 35 U.S.C. 154(b) by 829 days.

(21) Appl. No.: 14/528,061

(22) Filed: Oct. 30, 2014

(65) Prior Publication Data
US 2015/0118932 A1    Apr. 30, 2015

Related U.S. Application Data

(60) Provisional application No. 61/897,969, filed on Oct. 31, 2013.

(51) Int. Cl.
*C09D 5/00* (2006.01)

(52) U.S. Cl.
CPC ....... *C09D 5/00* (2013.01); *Y10T 428/249984* (2015.04); *Y10T 442/647* (2015.04)

(58) Field of Classification Search
CPC ................. C09D 5/00; D06N 3/0045; Y10T 428/249984; B32B 5/20; B32B 5/245; C08J 9/00
USPC ..... 442/9, 22, 30, 55, 56, 77, 221–227, 315, 442/370–375; 428/304.4–319.9, 613, 428/36.5, 71, 158, 322.7
See application file for complete search history.

(56) References Cited

U.S. PATENT DOCUMENTS

| | | | |
|---|---|---|---|
| 4,830,905 A | | 5/1989 | Gulya et al. |
| 6,720,362 B1 * | | 4/2004 | Park ................. B29C 44/5663 521/79 |
| 8,403,108 B2 | | 3/2013 | Bliton et al. |
| 8,439,161 B2 | | 5/2013 | Bliton et al. |
| 8,607,929 B2 | | 12/2013 | Bliton et al. |
| 2003/0035941 A1 | | 2/2003 | Burke et al. |
| 2004/0053003 A1 * | | 3/2004 | Coates .................... D04H 1/46 428/98 |
| 2005/0025967 A1 * | | 2/2005 | Lawton .................. C03C 25/00 428/375 |
| 2006/0065482 A1 * | | 3/2006 | Schmidft ............. B60R 13/083 181/290 |

(Continued)

FOREIGN PATENT DOCUMENTS

| | | |
|---|---|---|
| DE | 3626349 | 2/1988 |
| DE | 3626350 | 2/1988 |
| WO | 95/14136 | 5/1995 |

OTHER PUBLICATIONS

Young and Lovell, Introduction to Polymers Second Edition, CRC Press, 1991, pp. 10-11.*

(Continued)

*Primary Examiner* — Andrew T Piziali

(74) *Attorney, Agent, or Firm* — Myers Bigel, P.A.

(57) ABSTRACT

The present invention provides porous polymer coatings having adhesive and air flow resistive properties. The porous polymer coating comprises a polymeric foam having a void fraction of greater than about 15% and an air permeability greater than 3 cubic feet per minute per square foot as measured based on ASTM D737-04.

40 Claims, 11 Drawing Sheets

(56) References Cited

U.S. PATENT DOCUMENTS

| | | | | |
|---|---|---|---|---|
| 2006/0090958 | A1* | 5/2006 | Coates | G10K 11/162 181/290 |
| 2006/0189748 | A1 | 8/2006 | Amick et al. | |
| 2006/0251896 | A1 | 11/2006 | Ferencz et al. | |
| 2007/0264462 | A1* | 11/2007 | Covelli | B32B 5/22 428/43 |
| 2008/0200891 | A1* | 8/2008 | Kim | A61L 15/24 604/369 |
| 2010/0066121 | A1 | 3/2010 | Gross | |
| 2010/0126800 | A1 | 5/2010 | Albin, Jr. | |
| 2010/0143652 | A1* | 6/2010 | Stockton | A61K 8/0208 428/141 |
| 2010/0147621 | A1 | 6/2010 | Gillette | |
| 2011/0027534 | A1* | 2/2011 | Ogawa | B29C 33/68 428/153 |
| 2011/0183565 | A1* | 7/2011 | Menning | C08J 9/28 442/286 |
| 2011/0305940 | A1* | 12/2011 | Usami | B29C 44/04 429/144 |
| 2013/0186706 | A1 | 7/2013 | Bliton et al. | |
| 2013/0263738 | A1* | 10/2013 | Wang | B01D 46/521 95/285 |

OTHER PUBLICATIONS

Complete Textile Glossary, Celanese Acetate LLC, 2001, pp. 8 and 121.*

Odian, Principles of Polymerization, John Wiley and Sons, Inc., 2004, p. 139 (Year: 2004).*

Young and Lovell, Introduction to Polymers, 2nd Edition, CRC Press, 1991, pp. 10-11, (Year: 1991).*

Notification of Transmittal of the International Search Report and the Written Opinion of the International Searching Authority, or the Declaration corresponding to International Application No. PCT/US2014/063352 dated Mar. 17, 2015.

International Preliminary Report on Patentability corresponding to International Patent Application No. PCT/US2014/063352 (10 pages) (dated May 3, 2016).

ASTM International "Standard Test Method for Air Permeability of Textile Fabrics" *Designation: D737-04* (5 pages) (2012).

ASO Materials "Pigments—Particle Size Analysis of Organic Pigments Using Laser Diffraction by Horiba Scientific-Particle Pro" https://wwww.azom.com/article.aspx?ArticleID=4156 (11 pages) (2008).

International Search Report and the Written Opinion of the International Searching Authority corresponding to International Patent Application No. PCT/US19/15940 (8 pages) (dated Apr. 15, 2019).

* cited by examiner

POROUS POLYMER COATINGS

RELATED APPLICATION

This application claims priority from U.S. Provisional Application Ser. No. 61/897,969, filed Oct. 31, 2013, the disclosure of which is hereby incorporated by reference herein in its entirety.

FIELD OF THE INVENTION

The present application relates to porous polymer coatings.

BACKGROUND

Acoustically effective materials are used in a variety of applications and products, including, but not limited to, transportation applications, building applications, architectural applications, automobiles, heavy equipment, bus, rail transport vehicles, aircraft, air ducts, appliances, baffles, ceiling tiles and office partitions.

An acoustically effective facing may be applied to a substrate to impart and/or adjust one or more acoustic properties of the substrate. Exemplary acoustic facings are described in U.S. Patent Publication Nos. 2010/0147621 and 2013/0186706 and U.S. Pat. Nos. 8,403,108, 8,439,161, and 8,607,929; the disclosure of each of which is incorporated herein by reference in its entirety.

Acoustically effective facings may comprise an adhesive (e.g., a thermally activated adhesive). For example, some acoustically effective facings have an adhesive on one side thereof to allow for bonding to a thicker acoustic absorbing layer. Adhesive may be applied to acoustically effective facings by various means, including, but not limited to, screen printing, gravure coating, foam coating, die coating and scatter coating.

SUMMARY OF THE INVENTION

The present application provides a porous polymer coating. Such porous polymeric coatings imparts useful adhesive and acoustic properties to a substrate. Furthermore, we have discovered that the acoustic properties of such a composite material may be modulated by controlling the passage of air by the porous polymeric coating (e.g., by modulating the porosity of the porous polymeric coating). The porous polymer coating comprises a polymeric foam having a void fraction of greater than about 15% and an air permeability greater than 3 cubic feet per minute per square foot as measured based on ASTM D737-04.

DETAILED DESCRIPTION OF THE INVENTION

Figure 1:
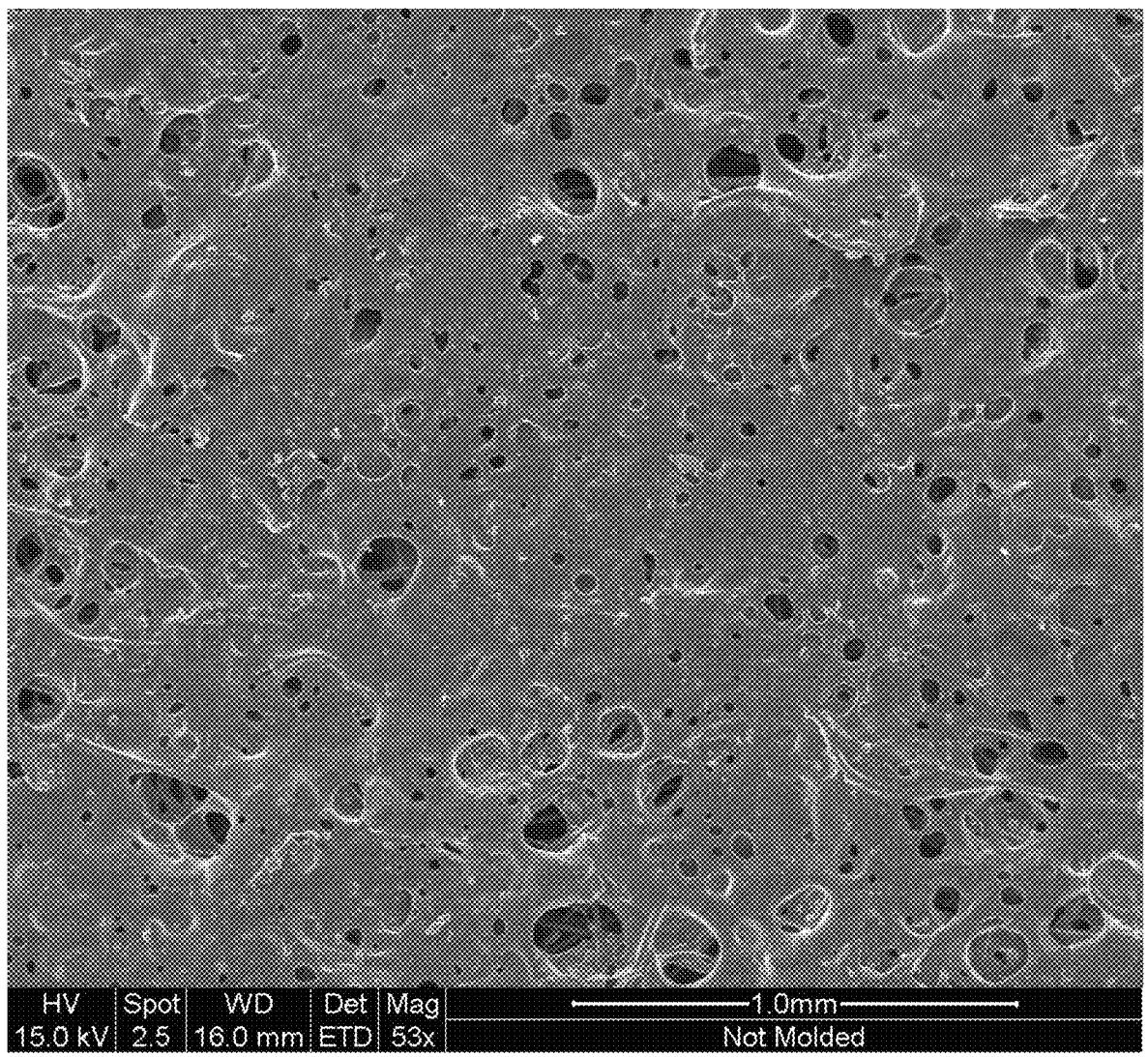
FIG. 1 is an image of the surface of a porous polymer coating according to some embodiments of the present invention. The image was acquired using a scanning electron microscope.
Figure 2:
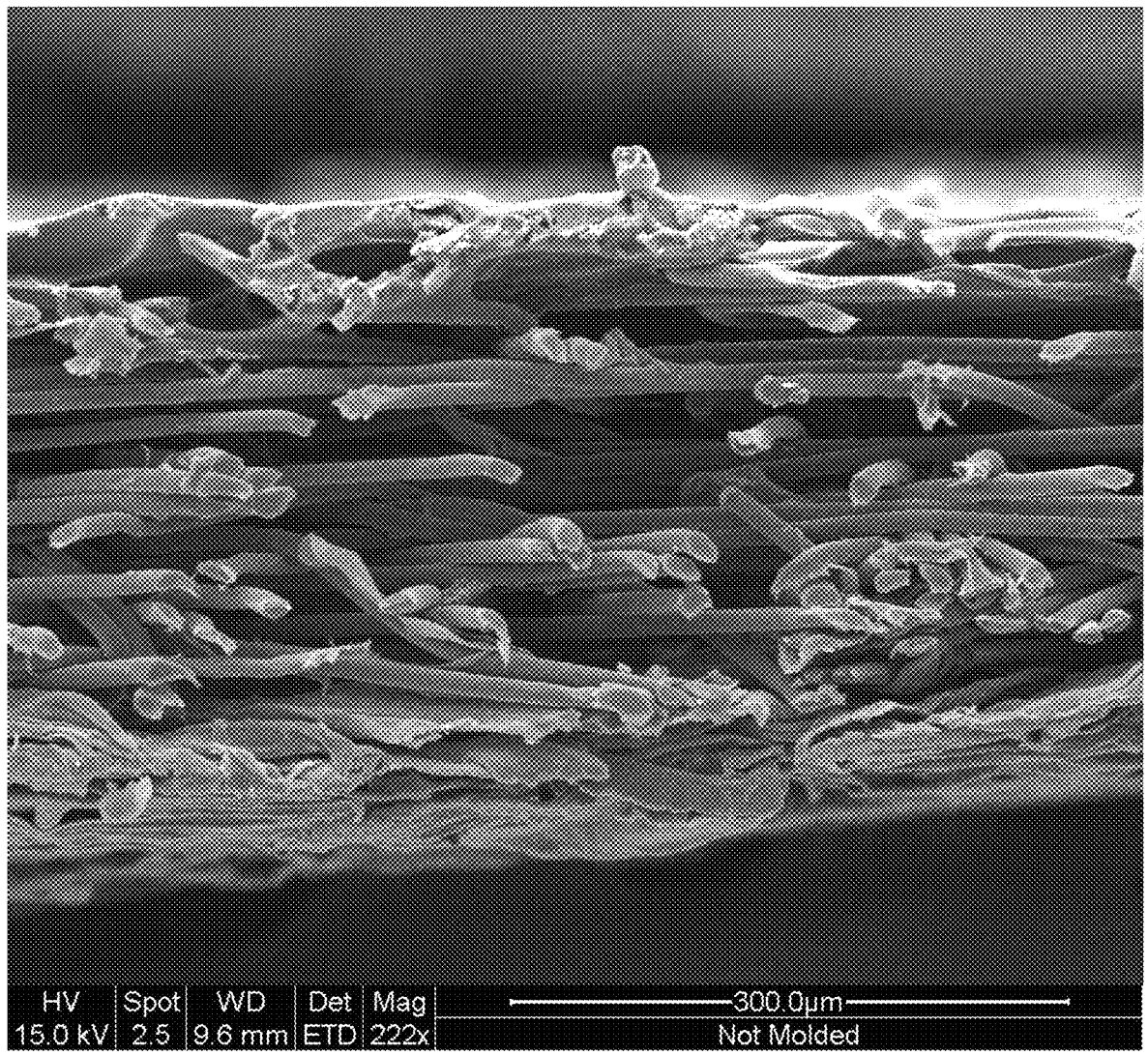
FIG. 2 is a cross-sectional image of the porous polymer coating depicted in FIG. 1. The image was acquired using a scanning electron microscope.

The present invention is explained in greater detail below. This description is not intended to be a detailed catalog of all the different ways in which the invention may be implemented or of all the features that may be added to the instant invention. For example, features illustrated with respect to one embodiment may be incorporated into other embodiments, and features illustrated with respect to a particular embodiment may be deleted from that embodiment. In addition, numerous variations and additions to the various embodiments suggested herein, which do not depart from the instant invention, will be apparent to those skilled in the art in light of the instant disclosure. Hence, the following specification is intended to illustrate some particular embodiments of the invention, and not to exhaustively specify all permutations, combinations and variations thereof.

It will be understood that when an element or layer is referred to as being "on", "attached to", "connected to", "coupled to", "coupled with" or "contacting" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. It will be appreciated by those of skill in the art that a structure referred to as being "directly on," "directly connected to, or "directly coupled to" another structure may partially or completely cover one or more surfaces of the other structure. It will also be appreciated by those of skill in the art that references to a structure or feature that is disposed "adjacent" another structure or feature may have portions that overlap or underlie the adjacent structure or feature.

The terminology used herein is for the purpose of describing particular embodiments only and is not intended to be limiting of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise.

As used herein, the term "about," when used in reference to a measurable value such as an amount of mass, dose, time, temperature, and the like, is meant to encompass variations of 20%, 10%, 5%, 1%, 0.5%, or even 0.1% of the specified amount.

As used herein, "ASTM" refers to ASTM, International, 100 Barr Harbor Drive, P.O. Box C700, West Conschoken, Pa. 19428-2959 USA.

As used herein, the term "air permeability" refers to the rate of air flow passing perpendicularly through a known area of a material under a prescribed air pressure differential. See, e.g., ASTM Standard D737-04, "Standard Test Method for Air Permeability of Textile Fabrics," ASTM International (2012) of 0.5 inches of water column pressure drop. Unless otherwise specified, the air permeability measurements described herein are expressed in cubic feet per minute per square foot (hereinafter "cfm").

As used herein, the term "airflow resistance" refers to the impedence of airflow through a known area of a material under a prescribed air pressure differential. See, e.g., ASTM Standard C522-03, "Standard Test Method for Airflow Resistance of Acoustical Materials," ASTM International (2009). Unless otherwise specified, the airflow resistance measurements described herein were measured based on ASTM Standard C522-03, "Standard Test Method for Airflow Resistance of Acoustical Materials," ASTM International (2009). Unless otherwise specified, the air permeability measurements described herein are expressed in Rayls. Air permeability and airflow resistance are reflective of expected acoustic impedance.

As used herein, the term "and/or" includes any and all combinations of one or more of the associated listed items.

As used herein, the term "batt" refers to a sheet or web of unbounded or lightly bonded fibers.

As used herein, the term "blow ratio" refers to the ratio of air to liquid in a porous material (e.g., a foam). For example, if a known volume of liquid was a weight of 20 grams, and air is introduced into the liquid such that an equal volume of the foamed liquid has a weight of 2 grams, the blow ratio of the foamed liquid is 10 (i.e., the foamed liquid has an air to liquid ratio of 10:1).

As used herein, the terms "comprise," "comprises," "comprising," "include," "includes" and "including" specify the presence of stated features, integers, steps, operations, elements, and/or components, but do not preclude the presence or addition of one or more other features, integers, steps, operations, elements, components, and/or groups thereof.

As used herein, the term "consists essentially of" (and grammatical variants thereof), as applied to the compositions and methods of the present invention, means that the compositions/methods may contain additional components so long as the additional components do not materially alter the composition/method. The term "materially alter," as applied to a composition/method, refers to an increase or decrease in the effectiveness of the composition/method of greater than about 20% or more. For example, a component added to a composition of the present invention would "materially alter" the composition if it increases or decreases the composition's durability by greater than 20%.

As used herein, the terms "increase" and "enhance" (and grammatical variants thereof) refer to an increase in the specified parameter of greater than about 1%, 2%, 3%, 4%, 5%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, 200%, 250%, 300% or more.

As used herein, the terms "inhibit", "decrease," and "reduce" (and grammatical variants thereof) refer to a decrease in the specified parameter of greater than about 1%, 2%, 3%, 4%, 5%, 10%, 15%, 20%, 25%, 30%, 35%, 40%, 45%, 50%, 55%, 60%, 65%, 70%, 75%, 80%, 85%, 90%, 95%, 99% or more.

As used herein, the term "latex" refers to an aqueous dispersion/emulsion of one or more polymers.

As used herein, the term "porous polymer coating" refers to a porous, polymeric structure that controls the passage of air.

As used herein, the term "Rayl" refers to specific acoustic impedance and/or characteristic acoustic impedance of an article. As one skilled in the art will readily appreciate, the acoustic impedance may be defined as one or two units: an MKS unit and a CGS unit. In MKS units, 1 Rayl equals 1 pascal-second per meter ($Pa \cdot s \cdot m^{-1}$). In CGS unites, 1 Rayl equals 1 dyne-second per cubic centimeter ($dyn \cdot s \cdot cm^{-3}$). 1 CGS Rayl=10 MKS Rayls. Unless otherwise specified, the Rayls measurements described herein are expressed in MKS units.

As used herein, the term "reticulated foam" refers to a foam wherein the majority of the bubbles/cells are not fully intact. In some embodiments, about 1%, 5%, 10%, 15%, 20%, 25%, 30%, 35%, 45%, 50%, 55% 60%, 65%, 70%, 75%, 80%, 85%, 90%, 95%, 96%, 97%, 98%, 99% or 100% of the bubbles/cells within the reticulated foam are open bubbles/cells. In some embodiments, the bubbles/cells are open to the extent that only the common/shared boundaries of the bubbles/cells remain intact.

As used herein, the term "thermally activatable" refers to a material that adhesively bonds when heated.

All publications, patent applications, patents, and other references mentioned herein are incorporated by reference in their entirety.

Porous polymer coatings of the present invention may comprise any suitable polymer, including, but not limited to, thermoplastic polymers and non-thermoplastic polymers. In some embodiments, porous polymer coatings of the present invention comprise, consist essentially of or consist of one or more thermoplastic polymers and/or one or more non-thermoplastic polymers. In some embodiments, porous polymer coatings of the present invention comprise, consist essentially of or consist of one or more thermoset polymers. In some embodiments, porous polymer coatings of the present invention comprise, consist essentially of or consist of one or more water soluble polymers. In some embodiments, porous polymer coatings of the present invention comprise, consist essentially of or consist of one or more polymers derived from an emulsion or a dispersion (e.g., one or more polymer layers derived from an emulsion or dispersion). In some embodiments, porous polymer coatings of the present invention comprise, consist essentially of or consist of one or more melted and extruded polymers. In some embodiments, porous polymer coatings of the present invention comprise, consist essentially of or consist of one or more copolymers and/or one or more polymer blends. In some embodiments, porous polymer coatings of the present invention comprise, consist essentially of or consist of one or more latex binders.

Porous polymer coatings of the present invention may comprise any suitable thermoplastic polymer, including, but not limited to, polyacrylates, polyvinylacetates, styrene butadiene rubbers, diallylorthophthalates, ionomers, formulated epoxys, polysulfones, perfluorinated polymers and elastomers, polyether-etherketones, acrylonitrilebutadienstyrenes, polycarbonates, vinylesters, styrene copolymers, polyamides, polyamines, ethylenevinylacetates, polyvinylalcohols, polyvinylchlorides, polyvinylidiene chloride, chlorinated polyethylenes, polyesters, nitriles, polyurethanes, polyethylenes, polypropylenes. In some embodiments, porous polymer coatings of the present invention comprise, consist essentially of or consist of one or more thermoplastic copolymers and/or one or more thermoplastic polymer blends. In some embodiments, the porous polymer coatings of the present invention comprise one or more acrylic thermoplastic polymers and one or more copolyester thermoset polymers.

Porous polymer coatings of the present invention may comprise any suitable additive, including, but not limited to, porogenic agents, adhesive agents, blowing agents, foaming agents, stabilizing agents (e.g., foam stabilizers, thermal stabilizers, light stabilizers, etc.), lubricating agents, tackifying agents, slip agents, elastic agents, antistatic agents, electrically conductive agents, antimicrobial agents (e.g., antibacterial agents, mildewcides, etc.), antifungal agents, coloring agents (e.g., pigments), repellant agents (e.g., water repellants, alcohol repellants, oil repellants, soil repellants, stain repellants, etc), flame retardant agents, UV resistant agents, UV absorption agents and filler agents, such as clay, calcium carbonate, minerals, polymer or mineral (e.g., glass) beads, metallic fillers, and the like. In some embodiments, porous polymer coatings of the present invention comprise one or more active agents. In some embodiments, porous polymer coatings of the present invention comprise one or more agents that increase the durability of the porous polymer coating (and/or a substrate to which the porous polymer coating is applied). For example, the porous polymer coating may comprise one or more isocyanates (e.g., blocked ioscyanates). In some embodiments, porous polymer coatings of the present invention comprise one or more flame retardant chemistries or additives. For example, the porous polymer coating may comprise one or more flame retardant antimony compounds (e.g., antimony oxides), one or more flame retardant boron compounds (e.g., ammonium borate, borax, boric acid, ethanolammonium borate and/or zinc borate), one or more flame retardant halogen compounds (e.g., ammonium bromide, ammonium chloride, brominated/chlorinated binders, brominated/chlorinated additives and/or brominated/chlorinated paraffin), one or more flame retardant nitrogen compounds (e.g., monoammonium phosphate, diammonium phosphate, ammonium borate, ammonium bromide, ammonium chloride, ammonium polyphosphate, melamine, and/or urea), organic and inorganic containing compounds, phosphorous containing compounds (e.g. ammonium polyphosphate), and/or one or more flame retardant sulfur compounds (e.g., ammonium sulfamate). In some embodiments, porous polymer coatings of the present invention comprise one or more antistats. For example, the porous polymer coating may comprise one or more salts, sodium chloride, sodium nitrate, sodium sulfate, or phosphate esters and/or one or more quaternary ammonium compounds.

Exemplary porous polymer coatings are described below in Table 1. The air permeability and airflow resistance of the porous polymer coatings can be modulated by adjusting porosity thereof (e.g., by adjusting the blow ratio, drying conditions and/or chemical additives used during formation).

TABLE 1

Exemplary Porous Polymer Coatings

| Ingredient | Description | Formula 1 (grams) | Formula 2 (grams) | Formula 3 (grams) | Formula 4 (grams) |
|---|---|---|---|---|---|
| Water | Carrier medium | 75 | | | 160 |
| Binder | Polymer dispersion or emulsion | 196 | | | |
| Flovan CGN | Phosphate based flame retardant | | | 70 | 40 |
| Exolit 462 | Phase 2 APP encapsulated with melamine | 24 | | | |
| Unifroth 144 | Anionic foaming agent | 2.5 | | | |
| Stanfax 320 | Ammonium stearate | 2.5 | 6 | 12 | 12 |
| Synthebond SA 110 | Styrene acrylate copolymer dispersion | | 200 | 154 | 90 |
| Fuller PN-3691-M | Styrene acrylate copolymer emulsion | | 100 | | |
| Synthebond SA103 | Styrene acrylate copolymer dispersion | | | 154 | 90 |

TABLE 1-continued

Exemplary Porous Polymer Coatings

| Ingredient | Description | Formula 1 (grams) | Formula 2 (grams) | Formula 3 (grams) | Formula 4 (grams) |
|---|---|---|---|---|---|
| Ammonyx LO | Lauramine oxide | | 6 | 8 | 8 |
| Aqueous Ammonium Hydroxide | Base for pH adjustment | | | 2 | 2 |

Porous polymer coatings of the present invention may be formed using any suitable method/composition/apparatus for introducing air into a polymer dispersion or emulsion, including, but not limited to, blowing agents, foaming agents, volatile liquids, commercial mixers (e.g., Hobart® (Troy, Ohio) mixers, KitchenAid® (St. Joseph, Mich.) mixers, etc.) and commercial foam generator systems (e.g., the CFS® System by Gaston Systems, Inc. of Stanley, N.C.). As will be appreciated by one skilled in the art, the porosity and/or consistency of the porous polymer coating may be selectively adjusted (i.e., tuned) by changing the constituents of the porous polymer coating and/or the tool/attachment/settings used to mix the polymer dispersion. For example, the porosity and/or consistency of a porous polymer coating may be selectively adjusted by changing the speed at which the polymer dispersion is mixed and/or the attachment with which the polymer dispersion is mixed.

Porous polymer coatings of the present invention may have any suitable basis weight. In some embodiments, the porous polymer coating has a basis weight of about 1, 2, 3, 4, 5, 6, 7, 8, 9, 10, 15, 20, 25, 30, 25, 40, 45, 50, 55, 60, 65, 70, 75, 80, 85, 90, 95, 100 grams per square meter (gsm) or less. In some embodiments, the porous polymer coating has a basis weight of about 1, 2, 3, 4, 5, 6, 7, 8, 9, 10, 15, 20, 25, 30, 25, 40, 45, 50, 55, 60, 65, 70, 75, 80, 85, 90, 95, 100 gsm or more. In some embodiments, a porous polymer coatings of the present invention is applied to a substrate (e.g., a fabric) that has a basis weight of about 10 to about 100 gsm.

Porous polymer coatings of the present invention may have an airflow resistance of about 100, 125, 150, 175, 200, 225, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1600, 1700, 1800, 1900, 2000, 2100, 2200, 2300, 2400, 2500, 2600, 2700, 2800, 2900, 3000, 3200, 3400, 3600, 3800, 4000, 4200, 4400, 4600, 4800, 5000, 5500, 6000, 6500, 7000, 7500, 8000, 8500, 9000, 9500, 10000 Rayls or more when tested based on ASTM Standard C522-03, "Standard Test Method for Airflow Resistance of Acoustical Materials," ASTM International (2009). In some embodiments, the porous polymer coating has an airflow resistance of between about 100 and about 10,000 Rayls.

Porous polymer coatings of the present invention may have an air permeability of about 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 110, 120, 130, 140, 150 cfm or less. In some embodiments, the porous polymer coating has an air permeability of between about 10 and about 100 cfm.

Porous polymer coatings of the present invention may have any suitable porous structure, including, but not limited to, reticulated porous structures and intact porous structures. In some embodiments, the porous polymer coating comprises a low density, reticulated foam structure. In some embodiments, the porous polymer coating comprises a reticulated foam structure formed by drying an intact foam structure such that intact bubbles/cells are converted to open bubbles/cells In some embodiments, the porous polymer coating has a void fraction of about 5%, 10%, 15%, 20%, 35%, 30%, 35%, 40%, 45%, 50%, 55%, 60%, 65%, 70%, 71%, 72%, 73%, 74%, 75%, 76%, 77%, 78%, 79%, 80%, 81%, 82%, 83%, 84%, 85%, 86%, 87%, 88%, 89% 90%, 91%, 92%, 93%, 94%, 95%, 96%, 97%, 98%, 99% or more.

Figure 3:
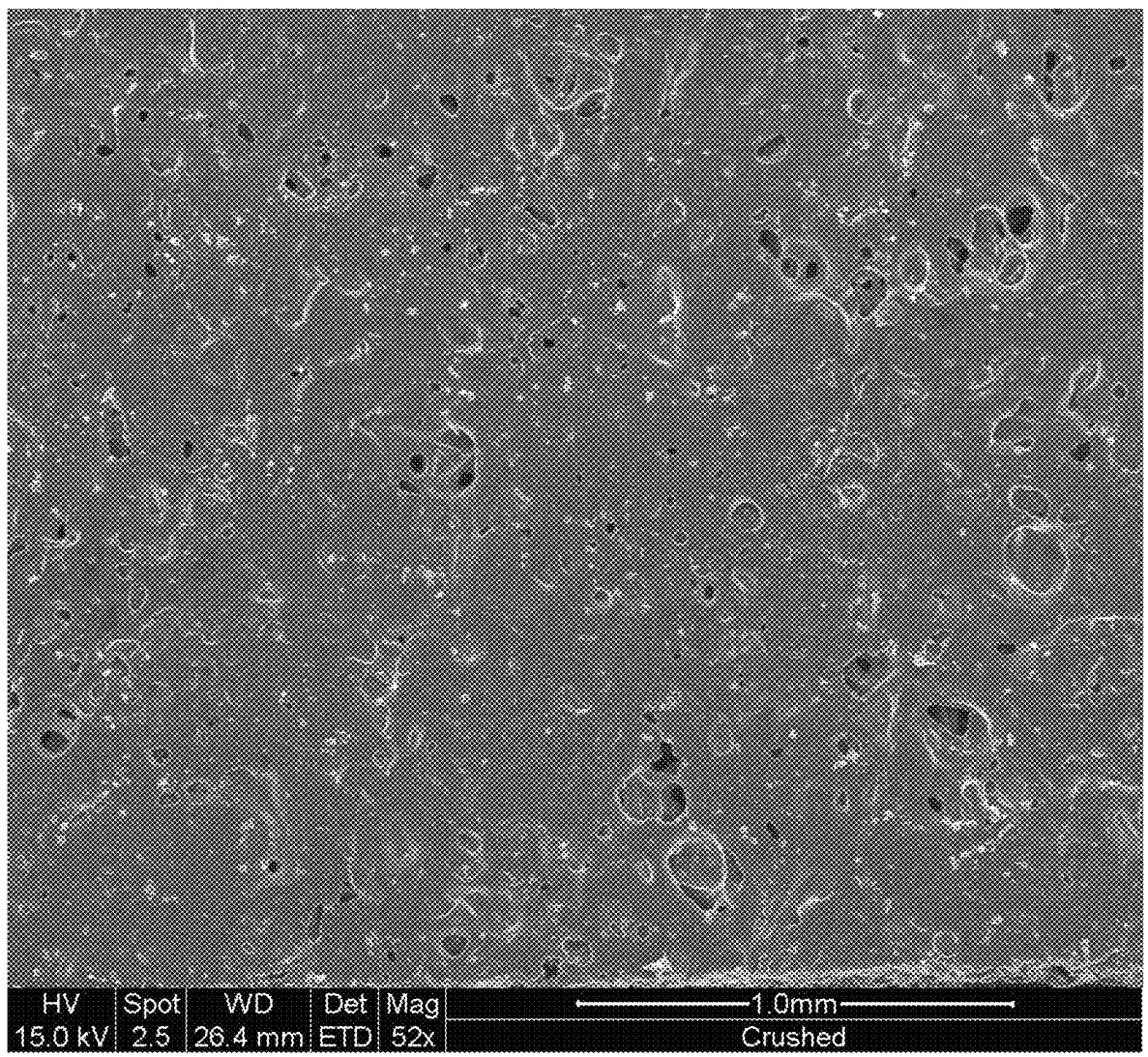
FIG. 3 is an image of the surface of a porous polymer coating according to some embodiments of the present invention. The sample was compressed prior to imaging. The image was acquired using a scanning electron microscope.
Figure 4:
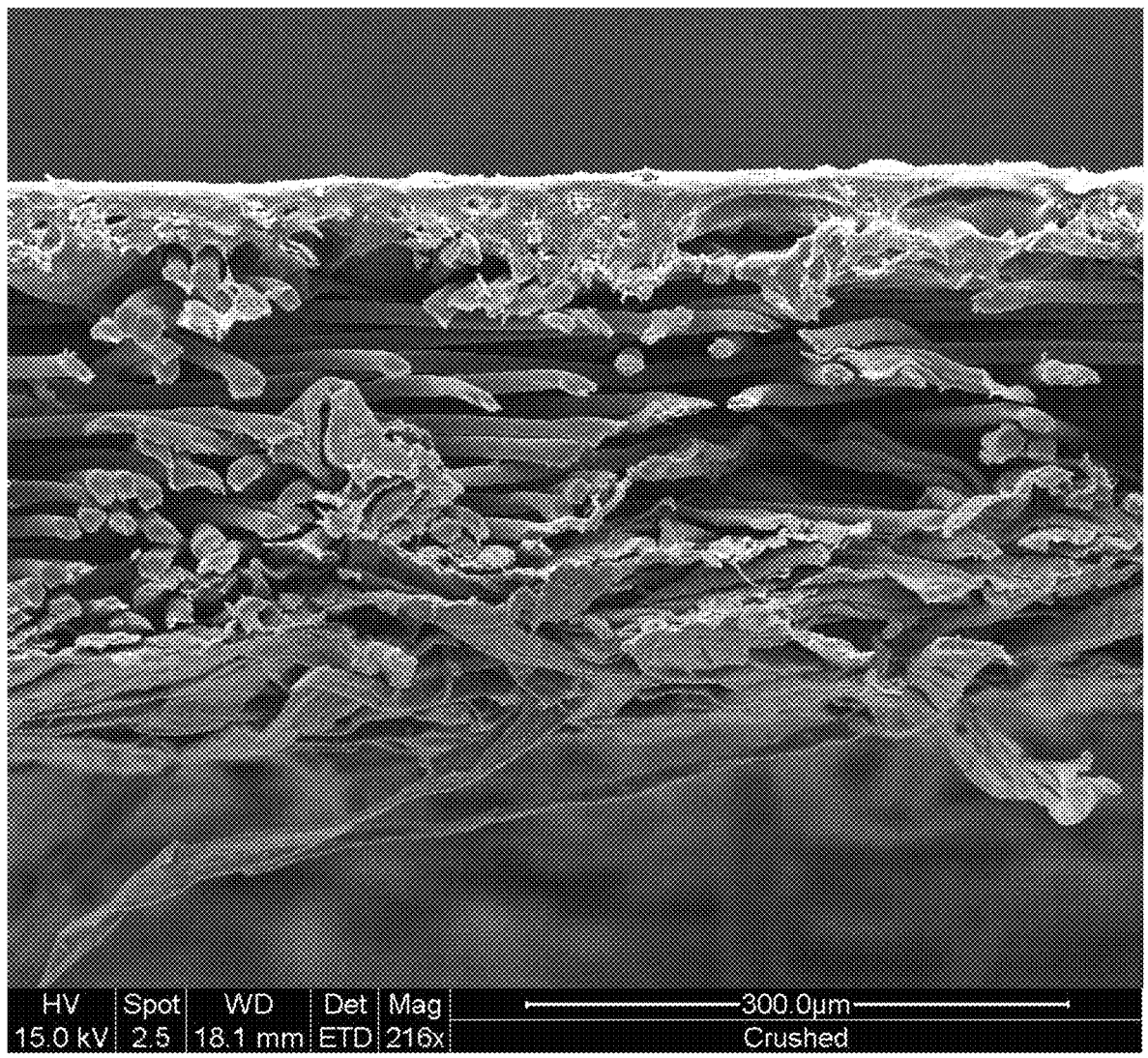
FIG. 4 is a cross-sectional image of the porous polymer coating depicted in FIG. 3. The image was acquired using a scanning electron microscope.
Figure 5:
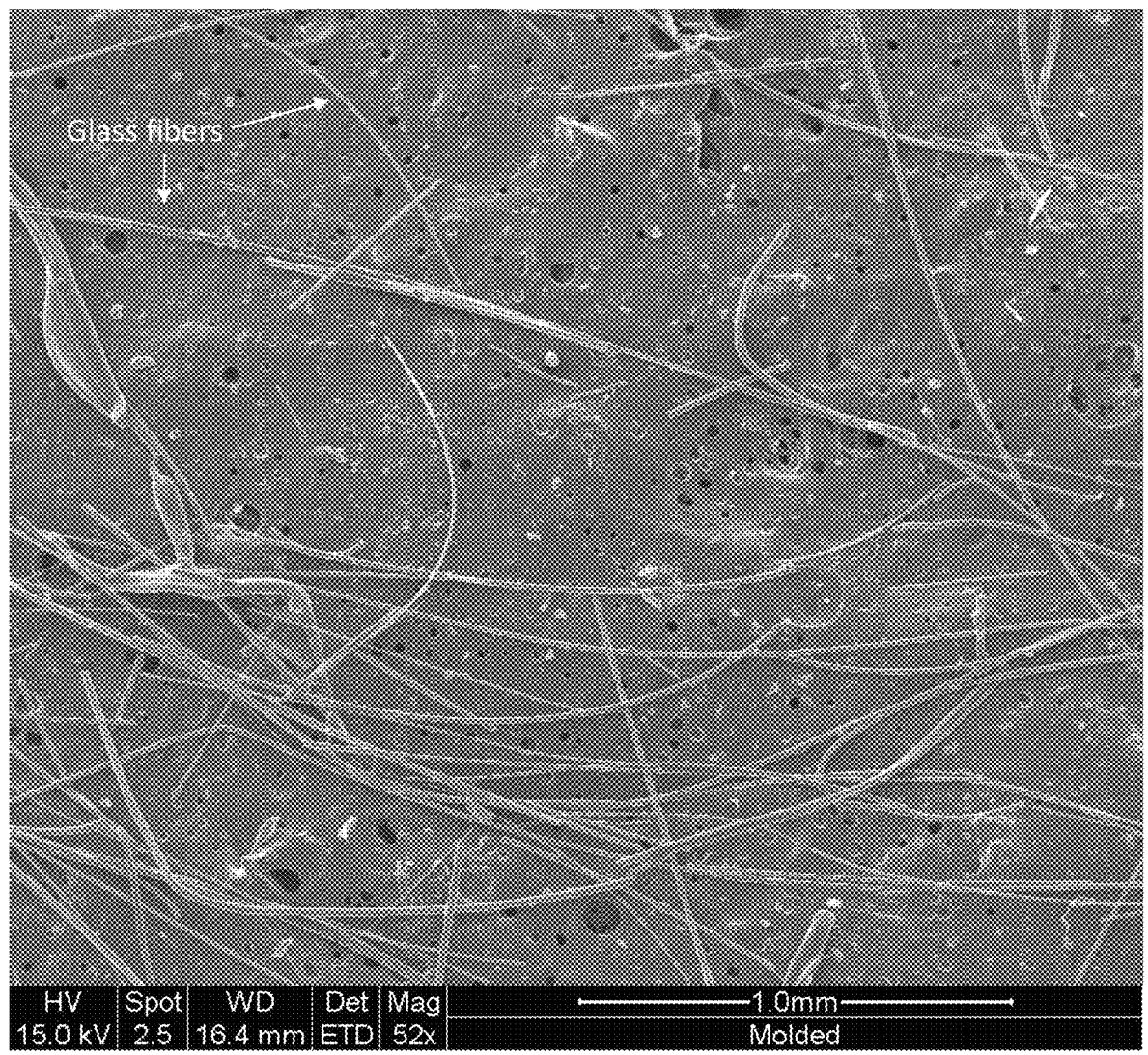
FIG. 5 is an image of the surface of a porous polymer coating according to some embodiments of the present invention. The sample was molded to and then removed from a web of fiberglass fibers prior to imaging. Residual glass fibers can be seen on the surface of the porous polymer coating. The image was acquired using a scanning electron microscope.
Figure 6:
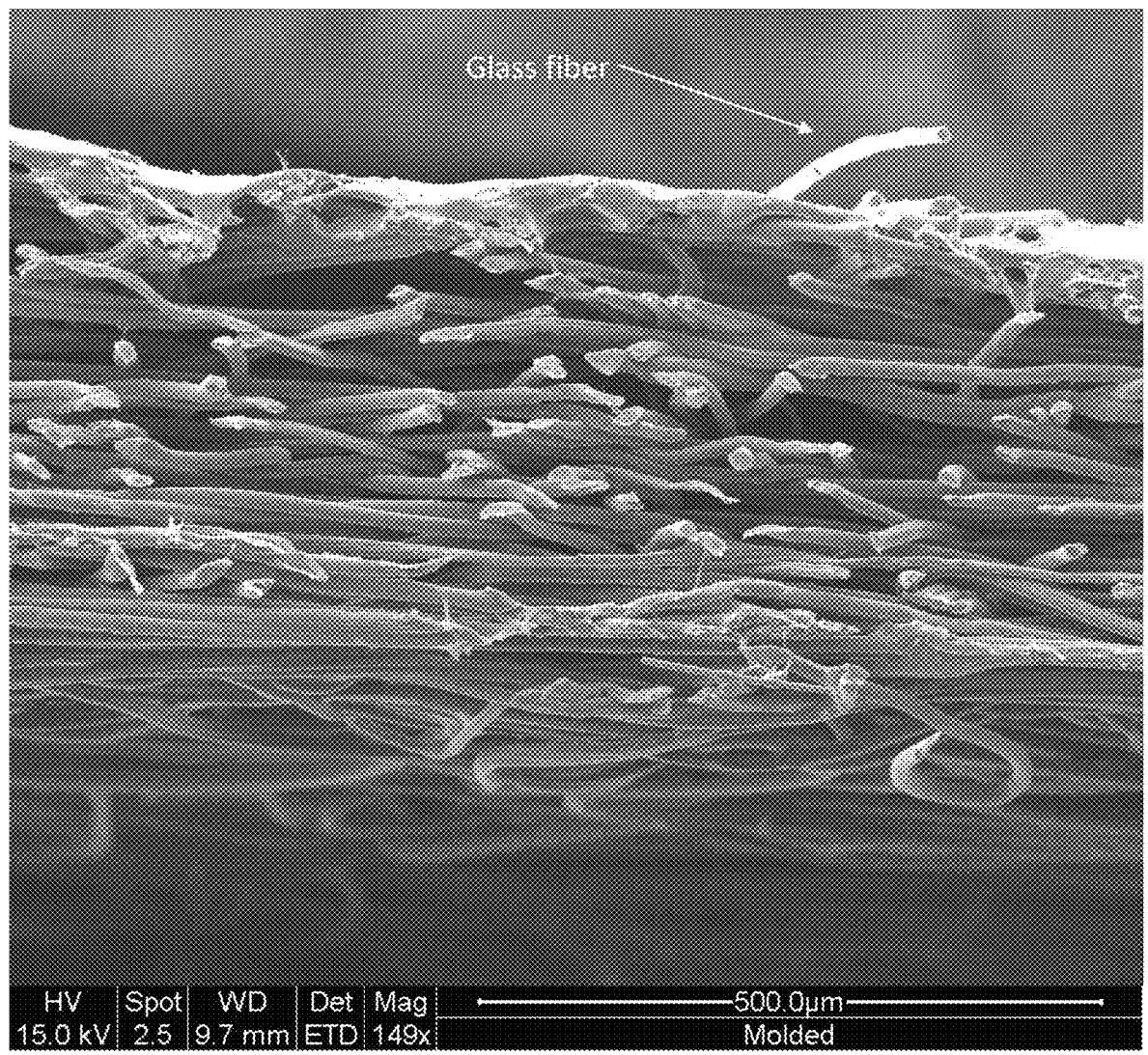
FIG. 6 is a cross-sectional image of the porous polymer coating depicted in FIG. 5. The image was acquired using a scanning electron microscope.

Porous polymer coatings of the present invention may retain their porous structure following compression (as shown in FIGS. 3-4) and/or molding to a substrate (as shown in FIGS. 5-6). In some embodiments, the void fraction of the porous polymer coating is reduced by about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95% or less following heat activation and molding/bonding to one or more substrates. In some embodiments, the void fraction of the porous polymer coating is reduced by about 10%, about 25%, about 50% or about 75% following heat activation and molding/bonding to one or more substrates. Porous polymer coatings of the present invention may have any suitable blow ratio. In some embodiments, the porous polymer coating has a blow ratio of about 1, 2, 3, 4, 5, 6, 7, 8, 9, 10, 11, 12, 13, 14, 15, 16, 17, 18, 19, 20 or more. In some embodiments, the porous polymer coating has a blow ratio of between about 1 and about 10.

Porous polymer coatings of the present invention may be applied to one or more substrates to form a composite material. In some embodiments, the composite material comprises a porous polymer coating of the present invention interposed between two substrates Porous polymer coatings of the present invention may be applied to any suitable substrate, including, but not limited to, batts, fabrics, nets, papers and films. In some embodiments, porous polymer coatings of the present invention are applied to building materials. In some embodiments, porous polymer coatings of the present invention are applied to nonporous substrates, such as a release liner, and then removed from the substrate for use without a substrate.

Porous polymer coatings of the present invention may be applied to any suitable batt, including, but not limited to, homopolymer batts, multifiber batts (e.g., shoddy batts), felts (e.g., needled felts), vertically lapped batts, pleated batts and thermally bonded batts. In some embodiments, porous polymer coatings are applied to batts comprising one or more glass fibers (e.g., glass insulation).

Porous polymer coatings of the present invention may be applied to any suitable type of fabric, including, but not limited to, woven fabrics, nonwoven fabrics and knit fabrics.

Porous polymer coatings of the present invention may be applied to any suitable nonwoven fabric, including, but not limited to, spunlaced fabrics, spunbonded fabrics, needlepunched fabrics, stitchbonded fabrics, thermal bonded fabrics, powder bonded fabrics, chemical bonded fabrics, wet laid fabrics and air laid fabrics. In some preferred embodiments, the porous polymer coating is applied to a spunlaced fabric.

Porous polymer coatings of the present invention may be applied to fabrics that have undergone any suitable mechanical treatment, including, but not limited to, calendaring, creping, embossing, ring rolling and stretching. In some embodiments of the invention the porous coating is applied to a substrate that has been chemically treated for certain properties that include, flame retardancy, oil, alcohol or water repellency, antistat, antimicrobial, corrosion inhibition, color, binders, and the like.

Porous polymer coatings of the present invention may be applied to fabrics having any suitable three-dimensional pattern(s). In some embodiments, porous polymer coatings of the present invention are applied to a nonwoven fabric comprising a three-dimensional pattern that mimics the three-dimensional texture of a woven textile (e.g., hopsack, terrycloth or twill). In some embodiments, porous polymer coatings of the present invention are applied to a nonwoven fabric comprising a three-dimensional pattern such that one or more surfaces of the fabric (e.g., the face of the fabric) has an average surface roughness of greater than about 5, 10, 20, 30, 40, 50, 60, 70, 75, 80, 90, 100, 125, 150, 175, 200, 250, 300, 350, 400, 450, 500, 550, 600, 650, 700, 750, 800, 850, 900, 950, 1000 or more microns (as measured based on the Kawabata Evaluation System (KES) using a KES-FB4 Surface Roughness Tester and/or as measured using a profilometer, for example).

Porous polymer coatings of the present invention may be applied to substrates comprising any suitable fiber type, including, but not limited to, batts/fabrics that comprise, consist essentially of or consist of natural fibers and/or synthetic fibers. In some embodiments, porous polymer coatings of the present invention are applied to batts/fabrics comprising, consisting essentially of or consisting of bamboo fibers, camel hair fibers, graphite fibers, cotton fibers, flax fibers, hemp fibers, jute fibers, polylactic acid fibers, silk fibers, sisal fibers, wood pulp and/or wool (e.g., alpaca, angora, cashmere, chiengora, guanaco, llama, mohair, pashmina, sheep and/or vicuña) fibers. In some embodiments, porous polymer coatings of the present invention are applied to batts/fabrics comprising, consisting essentially of or consisting of acrylic fibers, carbon fibers, fluorocarbon fibers, glass fibers (e.g., melt blown glass fibers, spunbonded glass fibers, air laid glass fibers and wet laid glass fibers), lyocell fibers, melamine fibers, modacrylic fibers, polyacrylonitrile (e.g., oxidized polyacrylonitrile) fibers, polyamide (e.g., nylon and/or aramid) fibers, polybenzimidazole fibers, polyester fibers, polyimide fibers, polylactic acid fibers, polyolefin (e.g., polyethylene and/or polypropylene) fibers, polyphenylene benzobisoxazole fibers, polyphenylene sulfide fibers, polyvinyl acetate fibers, polyvinyl alcohol fibers, polyvinyl chloride fibers, polyvinyl fluoride fibers, polyvinylidene chloride fibers, rayon fibers, viscose fibers, modified viscose (e.g., silica-modified viscose) fibers and zylon fibers. In some embodiments, porous polymer coatings of the present invention are applied to batts/fabrics comprising, consisting essentially of or consisting of cellulosic fibers (e.g., bamboo fibers, cellulose acetate fibers, cellulose triacetate fibers, cotton fibers, flax fibers, hemp fibers, jute fibers, lyocell fibers, ramie fibers, sisal fibers, viscose fibers, rayon fibers, modified viscose (e.g., silica-modified viscose) fibers and/or wood pulp). In some embodiments, porous polymer coatings of the present invention are applied to substrates comprising, consisting essentially of or consisting of bicomponent fibers. For example, porous polymer coatings of the present invention are applied to substrates comprising, consisting essentially of or consisting of fibers comprising greater than two distinct constituent monomers (e.g., polyester and polypropylene). In some embodiments, porous polymer coatings of the present invention are applied to substrates comprising, consisting essentially of or consisting of continuous fibers. In some embodiments, porous polymer coatings of the present invention are applied to substrates comprising a blend of fibers. (e.g. rayon and polyester). In some embodiments, porous polymer coatings of the present invention are applied to substrates comprising staple fibers. For example, porous polymer coatings of the present invention are applied to batts/fabrics comprising, consisting essentially of or consisting of one or more spunbonded fibers (e.g., flash spunbonded fibers), one or more meltblown fibers and/or one or more spunbonded-meltblown-spunbonded composite fibers. For example, a wet laid substrate such as a paper, a wet-laid nonwoven fabric, or a wet-laid spunlaced fabric may be used.

Porous polymer coated substrates of the present invention may be subsequently bonded to an additional sound absorbing material to form a multilayer product that has enhanced air flow resistance and improved sound absorbing capability. The bonding of the inventive substrate to the additional sound absorbing material is facilitated by the adhesive properties of the coating. The products produced in this way include molded sound absorbing panels for vehicles and aircraft, bonded sound absorbing panels for architectural use, sound absorbing materials for ductwork, acoustic and musical end uses such as speakers, panels for auditoriums, and the like.

Porous polymer coatings of the present invention may be applied to a substrate having any suitable basis weight. In some embodiments, a porous polymer coatings of the present invention is applied to a substrate (e.g., a fabric) that has a basis weight of about 10, 15, 20, 25, 30, 25, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 420, 440, 460, 480, 500, 520, 540, 560, 580, 600, 650, 700, 750, 800, 850, 900, 950, 1000, 1100, 1200, 1300, 1400, 1500, 1600, 1700, 1800, 1900 or 2000 gsm or less. In some embodiments, a porous polymer coatings of the present invention is applied to a substrate (e.g., a fabric) that has a basis weight of about 10, 15, 20, 25, 30, 25, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 420, 440, 460, 480, 500, 520, 540, 560, 580, 600, 650, 700, 750, 800, 850, 900, 950, 1000, 1100, 1200, 1300, 1400, 1500, 1600, 1700, 1800, 1900, 2000 gsm or more. In some embodiments, a porous polymer coatings of the present invention is applied to a substrate (e.g., a fabric) that has a basis weight of about 10 to about 100 gsm.

Porous polymer coatings of the present invention may be applied to a substrate having any suitable airflow resistance. In some embodiments, a porous polymer coating of the present invention is applied to a substrate (e.g., a fabric) that has an airflow resistance of about 1, 2, 3, 4, 5, 6, 7, 8, 9, 10, 20, 30, 40, 50, 60, 70, 80, 90, 100, 125, 150, 175, 200, 225, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1600, 1700, 1800, 1900, 2000, 2100, 2200, 2300, 2400, 2500 Rayls or more when tested based on ASTM Standard C522-03, "Standard Test Method for Airflow Resistance of Acoustical Materials," ASTM International (2009). In some embodiments, the porous polymer coating of the present invention is applied to a substrate (e.g., a fabric) that has an airflow resistance of between about 10 and about 1,000 Rayls.

Porous polymer coatings of the present invention may be applied to a substrate having any suitable air permeability. In some embodiments, a porous polymer coating of the present invention is applied to a substrate (e.g., a fabric) that has an air permeability of about 2, 10, 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 400, 450, 500, 550, 600, 650, 700, 750, 800, 850, 900, 950, 1000 cfm or more. In some embodiments, the porous polymer coating is applied to a substrate (e.g., a fabric) that has an air permeability of between about 10 and about 1,000 cfm/sq. ft., based on ASTM Standard D737-04, "Standard Test Method for Air Permeability of Textile Fabrics," ASTM International (2012).

Porous polymer coatings of the present invention may be applied to a substrate that is a polymeric foam. Examples would be urethane foam, foamed rubber both natural and synthetic, foamed polymers such as olefins, polystyrene, acrylates, styrene butadiene, and mixtures of polymers.

Porous polymer coatings of the present invention may be applied to a carpet, which would enhance the sound absorption of the carpet and allow for thermally activated bonding of the carpet to another material or surface. Additionally, a substrate, coated with the porous coating of the present invention may be bonded to the back of carpet to enhance the sound absorption of the carpet in use.

Porous polymer coatings of the present invention may be applied using any suitable method, including, but not limited to, knife coating, scrape coating, kiss coating, gap coating, foam coating, spray coating, roll coating, gravure coating, screen printing, slot coating, electrostatic coating and starved die coating. In some embodiments, the application process comprises greater than partially melting the porous polymer coating. The airflow resistance of the porous polymer coating may remain the same (or substantially the same) following application (e.g., following the activation and adhesive bonding of the porous polymer coating to one or more substrates). The airflow resistance of the porous polymer coating may change in a predictable manner following application (e.g., following the activation and adhesive bonding of the porous polymer coating to one or more substrates). The porosity or permeability of the coating or coated substrate may be further modified by calendaring, embossing, crushing, or chemical treatment.

Porous polymer coatings of the present invention may impart and/or modulate any suitable characteristic to/of the substrate(s). In some embodiments, the porous polymer coating imparts one or more adhesive properties to and/or modulates one or more adhesive properties of the substrate(s). For example, the porous polymer coating may impart adhesive properties that allow two or more substrates to be molded together to form a composite material. Similarly, the porous polymer coating may increase the adhesiveness of a substrate by about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, 200%, 250%, 300% or more. In some embodiments, the porous polymer coating imparts one or more acoustic properties to and/or modulates one or more acoustic properties of the substrate(s). For example, the porous polymer coating may lower the air permeability of a substrate by about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95% or more. Likewise, the porous polymer coating may increase the airflow resistance of a substrate by about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, 200%, 250%, 300% or more. In some embodiments, the porous polymer coating modulates the strength of the substrate(s). For example, the porous polymer coating may increase the strength of the substrate(s) by about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, 200%, 250%, 300% or more. In some embodiments, the porous polymer coating modulates the durability of the substrate(s). For example, the porous polymer coating may increase the durability of the substrate(s) by about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, 200%, 250%, 300% or more. In some embodiments, the porous polymer coating modulates the abrasion resistance of the substrate(s). For example, the porous polymer coating may increase the abrasion resistance of the substrate(s) 6%, 7%, 8%, 9%, by about 1%, 2%, 3%, 4%, 5%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, 200%, 250%, 300% or more.

As indicated above, composite materials of the present invention may comprise any suitable combination of porous polymer coating(s) and substrate(s) and may be formed using any suitable technique.

Composite materials of the present invention may have any suitable basis weight. In some embodiments, composite materials of the present invention have a basis weight of about 10, 15, 20, 25, 30, 25, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 420, 440, 460, 480, 500, 520, 540, 560, 580, 600, 650, 700, 750, 800, 850, 900, 950, 1000, 1100, 1200, 1300, 1400, 1500, 1600, 1700, 1800, 1900, 2000 gsm or less. In some embodiments, composite materials of the present invention have a basis weight of about 10, 15, 20, 25, 30, 25, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 420, 440, 460, 480, 500, 520, 540, 560, 580, 600, 650, 700, 750, 800, 850, 900, 950, 1000, 1100, 1200, 1300, 1400, 1500, 1600, 1700, 1800, 1900, 2000 gsm or more.

Composite materials of the present invention may demonstrate reduced air permeability. In some embodiments, the air permeability of the composite material is reduced by about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 96%. 97%, 98%, 99% or 100% as compared to a control substrate (i.e., a substrate that lacks the porous polymer coating but is otherwise identical to the composite material) when tested based on ASTM Standard C522-03, "Standard Test Method for Airflow Resistance of Acoustical Materials," ASTM International (2009); ASTM Standard D737-04, ""Standard Test Method for Air Permeability of Textile Fabrics," ASTM International (2012). In some embodiments, the substrate is a fabric (e.g., a nonwoven fabric), and the air permeability of the composite material is reduced by about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 96%. 97%, 98%, 99% or 100% as compared to a control fabric having the same amounts/types of fibers, weight, thickness as the fabric of the composite material.

Composite materials of the present invention may demonstrate enhanced airflow resistance. In some embodiments, the airflow resistance of the composite material is increased by about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, 200%, 250%, 300% or more as compared to a control substrate (i.e., a substrate that lacks the porous polymer coating but is otherwise identical to the composite material) when tested based on ASTM Standard C522-03, "Standard Test Method for Airflow Resistance of Acoustical Materials," ASTM International (2009); ASTM Standard D737-04, ""Standard Test Method for Air Permeability of Textile Fabrics," ASTM International (2012). In some embodiments, the substrate is a fabric (e.g., a nonwoven fabric), and the airflow resistance of the composite material is increased by about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, 200%, 250%, 300% or more as compared to a control fabric having the same amounts/types of fibers, weight, thickness as the fabric of the composite material.

Composite materials of the present invention may have an airflow resistance of about 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1600, 1700, 1800, 1900, 2000, 2100, 2200, 2300, 2400, 2500, 2600, 2700, 2800, 2900, 3000, 3200, 3400, 3600, 3800, 4000, 4200, 4400, 4600, 4800, 5000, 5500, 6000, 6500, 7000, 7500, 8000, 8500, 9000, 9500, 10000 Rayls or more when based on ASTM Standard C522-03, "Standard Test Method for Airflow Resistance of Acoustical Materials," ASTM International (2009); ASTM Standard D737-04, ""Standard Test Method for Air Permeability of Textile Fabrics," ASTM International (2012). In some embodiments, the composite material has an airflow resistance of about 100 to about 10,000 Rayls. In some embodiments, the composite material comprises, consists essentially of or consists of one substrate and one porous polymer coating and has an airflow resistance of about 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1600, 1700, 1800, 1900, 2000, 2100, 2200, 2300, 2400, 2500, 2600, 2700, 2800, 2900, 3000, 3200, 3400, 3600, 3800, 4000, 4200, 4400, 4600, 4800, 5000, 5500, 6000, 6500, 7000, 7500, 8000, 8500, 9000, 9500, 10000 Rayls or more. In some embodiments, the composite material comprises, consists essentially of or consists of one substrate and one porous polymer coating and has an airflow resistance of about 100 to about 10,000 Rayls. In some embodiments, the composite material comprises, consists essentially of or consists of a porous polymer coating interposed between two substrates and has an airflow resistance of about 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1600, 1700, 1800, 1900, 2000, 2100, 2200, 2300, 2400, 2500, 2600, 2700, 2800, 2900, 3000, 3200, 3400, 3600, 3800, 4000, 4200, 4400, 4600, 4800, 5000, 5500, 6000, 6500, 7000, 7500, 8000, 8500, 9000, 9500, 10000 Rayls or more. In some embodiments, the composite material comprises, consists essentially of or consists of a porous polymer coating interposed between two substrates and has an airflow resistance of about 100 to about 10,000 Rayls.

Composite materials of the present invention may demonstrate enhanced strength. In some embodiments, the strength of the composite material is increased by about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, 200%, 250%, 300% or more as compared to a control material (i.e., a substrate that lacks the porous polymer coating but is otherwise identical to the composite material) when tested in based on ASTM Standard D1682-64, "Standard Test Methods for Breaking Load and Elongation of Textile Fabrics," ASTM International (1975); ASTM Standard D5034-09, "Standard Test Methods for Breaking Load and Elongation of Textile Fabrics (Grab Test)," ASTM International (2013); ASTM Standard D5035-11, "Standard Test Methods for Breaking Load and Elongation of Textile Fabrics (Strip Method)," ASTM International (2011); ASTM Standard D1117-01, "Standard Guide for Evaluating Nonwoven Fabrics," ASTM International (2001). In some embodiments, the substrate is a fabric (e.g., a nonwoven fabric), and the strength of the composite material is increased by about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, 200%, 250%, 300% or more as compared to a control fabric having the same amounts/types of fibers, weight, thickness as the fabric of the composite material.

Composite materials of the present invention may demonstrate enhanced durability. In some embodiments, the durability of the composite material is increased by about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, 200%, 250%, 300% or more as compared to a control material (i.e., a substrate that lacks the porous polymer coating but is otherwise identical to the composite material) when based on ASTM Standard D4157-13, "Standard Test Method for Abrasion Resistance of Textile Fabrics (Oscillatory Cylinder Method)," ASTM International (2013); ASTM Standard D4158-08, "Standard Guide for Abrasion Resistance of Textile Fabrics (Uniform Abrasion)," ASTM International (2012); ASTM Standard D3389-10, ""Standard Test Method for Coated Fabrics Abrasion Resistance," ASTM International (2010); ASTM Standard D3885-07a, "Standard Test Method for Abrasion Resistance of Textile Fabrics (Flexing and Abrasion Method)," ASTM International (2011); ASTM Standard D3886-99, "Standard Test Method for Abrasion Resistance of Textile Fabrics (Inflated Diaphragm Apparatus)," ASTM International (2011); ASTM Standard D4966-12, "Standard Test Method for Abrasion Resistance of Textile Fabrics (Martindale Abrasion Tester Method)," ASTM International (2013); ASTM Standard D3884-09, "Standard Test Method for Abrasion Resistance of Textile Fabrics (Rotary Platform, Double-Head Method)," ASTM International (2013); ASTM Standard D3597-02, "Standard Specfication for Woven Upholstery Fabrics-Plain, Tufted or Flocked," ASTM International (2009); ASTM Standard D4037-02, ""Standard Performance Specificaiton for Woven, Knitted or Flocked Bedspread Fabrics," ASTM International (2008); ASTM Standard D1117-01, "Standard Guide for Evaluating Nonwoven Fabrics," ASTM International (2001). In some embodiments, the substrate is a fabric (e.g., a nonwoven fabric), and the durability of the composite material is increased by about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, 200%, 250%, 300% or more as compared to a control fabric having the same amounts/types of fibers, weight, thickness as the fabric of the composite material.

Composite materials of the present invention may demonstrate enhanced abrasion resistance. In some embodiments, the abrasion resistance of the composite material is increased by about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, 200%, 250%, 300% or more as compared to a control material (i.e., a substrate that lacks the porous polymer coating but is otherwise identical to the composite material) when tested based on ASTM Standard D4157-13, "Standard Test Method for Abrasion Resistance of Textile Fabrics (Oscillatory Cylinder Method)," ASTM International (2013); ASTM Standard D4158-08, "Standard Guide for Abrasion Resistance of Textile Fabrics (Uniform Abrasion)," ASTM International (2012); ASTM Standard D3389-10, ""Standard Test Method for Coated Fabrics Abrasion Resistance," ASTM International (2010); ASTM Standard D3885-07a, "Standard Test Method for Abrasion Resistance of Textile Fabrics (Flexing and Abrasion Method)," ASTM International (2011); ASTM Standard D3886-99, "Standard Test Method for Abrasion Resistance of Textile Fabrics (Inflated Diaphragm Apparatus)," ASTM International (2011); ASTM Standard D4966-12, "Standard Test Method for Abrasion Resistance of Textile Fabrics (Martindale Abrasion Tester Method)," ASTM International (2013); ASTM Standard D3884-09, "Standard Test Method for Abrasion Resistance of Textile Fabrics (Rotary Platform, Double-Head Method)," ASTM International (2013); ASTM Standard D3597-02, "Standard Specification for Woven Upholstery Fabrics-Plain, Tufted or Flocked," ASTM International (2009); ASTM Standard D4037-02, ""Standard Performance Specification for Woven, Knitted or Flocked Bedspread Fabrics," ASTM International (2008); ASTM Standard D1117-01, "Standard Guide for Evaluating Nonwoven Fabrics," ASTM International (2001). In some embodiments, the substrate is a fabric (e.g., a nonwoven fabric), and the abrasion resistance of the composite material is increased by about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, 200%, 250%, 300% or more as compared to a control fabric having the same amounts/types of fibers, weight, thickness as the fabric of the composite material.

Composite materials of the present invention may demonstrate enhanced adhesive properties. In some embodiments, the adhesiveness of the composite material is increased by about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, 200%, 250%, 300% or more as compared to a control material (i.e., a substrate that lacks the porous polymer coating but is otherwise identical to the composite material) when tested based on AATTC Standard 136, "Bond Strength of Bonded and Laminated Fabrics," American Association of Textile Chemists and Colorists, (2012); ASTM Standard D6862-11, "Standard Test Method for 90 Degree Peel Resistance of Adhesives," ASTM International (2012); ASTM Standard D3167-10, "Standard Test Method for Floating Roller Peel Resistance of Adhesives," ASTM International (2010); ASTM Standard D2724-07, "Standard Test Methods for Bonded, Fused, and Laminated Apparel Fabrics," ASTM International (2011); HN Standard 0192, "Test Method for Determining Bond Strength of Laminated Fabrics," (2007). In some embodiments, the substrate is a fabric (e.g., a nonwoven fabric), and the adhesiveness of the composite material is increased by about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, 200%, 250%, 300% or more as compared to a control fabric having the same amounts/types of fibers, weight, thickness as the fabric of the composite material.

In addition, the porous polymer coating of the invention, may be coated on both the top and bottom side of the substrate, which increases the effectiveness of the product. The coated on both sides material, may then be used on top or bottom of a sound absorbing panel, or inserted between two batts, foams, panels, or fabrics to improve, the acoustic performance, the sound absorption ability, or the ability to absorb certain frequencies of sound, by the final product and allow for thermally activated adhesive bonding of the layers. Alternately the porous polymer coating of the invention, with both top and bottom coated onto a substrate, may be inserted between dissimilar materials, such as batts, foams, panels, fabrics, or carpet, and allow for thermally activated adhesive bonding of the layers.

Accordingly, composite materials of the present invention may be suitable for use in numerous applications and products, including, but not limited to, transportation applications, building applications, architectural applications, automobiles, aircraft, air ducts, appliances, baffles, ceiling tiles and office partitions.

EXAMPLES

The following examples are not intended to be a detailed catalogue of all the different ways in which the present invention may be implemented or of all the features that may be added to the present invention. Those skilled in the art will appreciate that numerous variations and additions to the various embodiments may be made without departing from the present invention. Hence, the following descriptions are intended to illustrate some particular embodiments of the invention, and not to exhaustively specify all permutations, combinations and variations thereof.

Example 1

A porous polymer coating was formed by introducing a styrene acrylic copolymer mixture according to Formula 2 of Table 1 above into a CFS® foam generator system (Gaston Systems, Inc., Stanley, N.C.) and foaming the mixture using air at around 80 pounds per square inch (psi) and a blow ratio of approximately 3.3. The foam was coated onto a spunbond web comprising polyester (100% by weight) with a nominal basis weight of about 34 gsm using a knife gap of about 40 mils. The coated web was dried in a forced air oven for about 1 minute at approximately 155° C. The dry add-on weight of the porous polymer coating was around 93 gsm. The air permeability of the web prior to application/drying of the porous polymer coating was about 711 cfm. The air permeability of the composite material was about 1 cfm.

Example 2

A porous polymer coating was formed by introducing a styrene acrylic copolymer mixture according to Formula 2 of Table 1 above into a CFS® foam generator system (Gaston Systems, Inc., Stanley, N.C.) and foaming the mixture using air at around 80 pounds per square inch (psi) and a blow ratio of 5.6. The foam was coated onto a spunbond web comprising polyester (100% by weight) and weighing 34 gsm using a knife gap of 40 mils. The coated web was dried in a forced air oven for 1 minute at 175° C. The dry add-on weight of the porous polymer coating was approximately 46.3 gsm. The air permeability of the web prior to application/drying of the porous polymer coating was about 711 cfm. The air permeability of the composite material was about 74.4 cfm.

Figure 7:
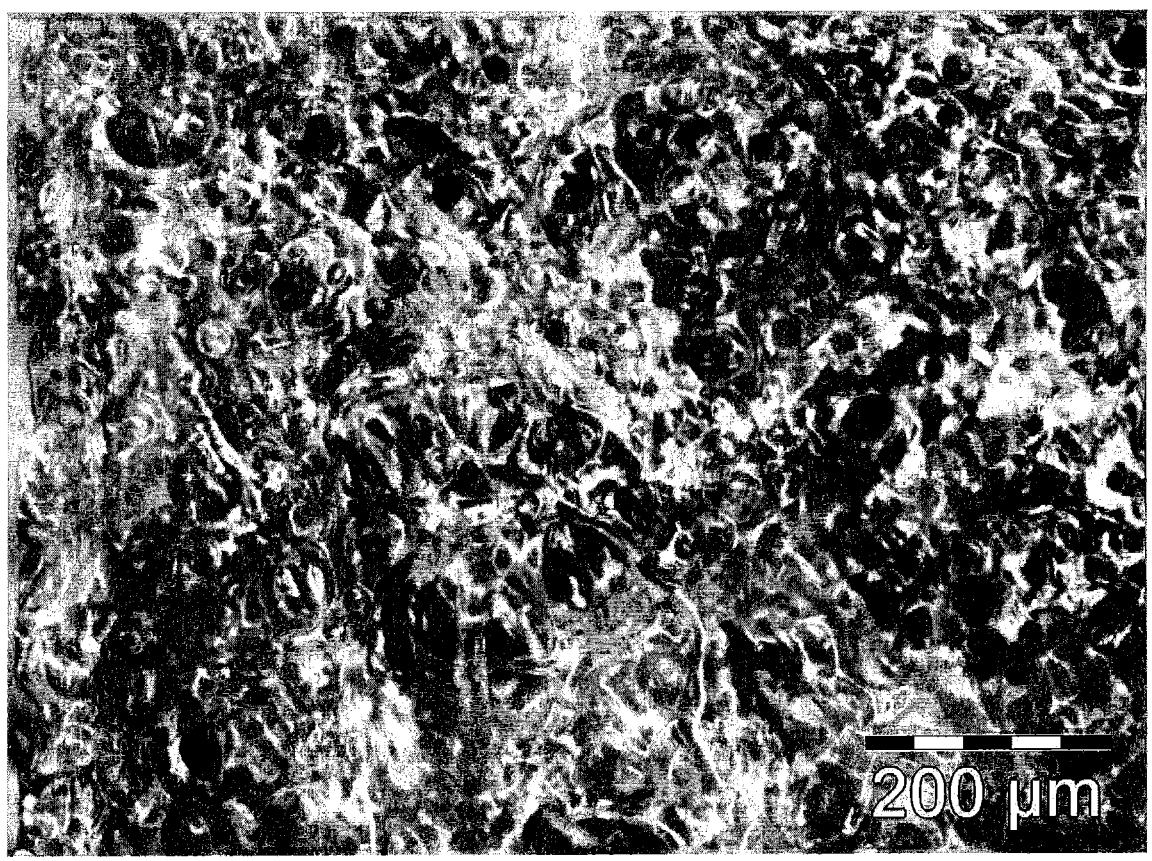
FIG. 7 is an image of the surface of a porous polymer coating according to some embodiments of the present invention. The image was acquired using a scanning electron microscope.

FIG. 7 provides an exemplary image of the porous polymer coating that was added to the polyester spunbond web.

Example 3

A porous polymer coating was formed by introducing a styrene acrylic copolymer mixture according to Formula 2 of Table 1 above into a CFS® foam generator system (Gaston Systems, Inc., Stanley, N.C.) and foaming the mixture using air at around 80 pounds per square inch (psi) and a blow ratio of 5.6. The foam was coated onto a spunbond web comprising polyester (100% by weight) with a nominal basis weight of about 34 gsm using a knife gap of 40 mils. The coated web was dried in a forced air oven for 1 minute at 155° C. The dry add-on weight of the porous polymer coating was around 43.6 gsm. The air permeability of the web prior to application/drying of the porous polymer coating was about 711 cfm. The air permeability of the composite material was about 81.8 cfm.

Example 4

A porous polymer coating was formed by introducing a styrene acrylic copolymer mixture according to Formula 2 of Table 1 above into a CFS® foam generator system (Gaston Systems, Inc., Stanley, N.C.) and foaming the mixture using air at around 80 pounds per square inch (psi) and a blow ratio of approximately 5.6. The foam was coated onto a spunbond web comprising polyester (100% by weight) with a nominal basis weight of about 34 gsm using a knife gap of about 40 mils. The coated web was dried in a forced air oven for about 1 minute at around 175° C. The dry add-on weight of the porous polymer coating was around 46.3 gsm.

A 12 inch by 12 inch sample of the composite material was bonded to a 12 inch by 12 inch piece of corrugated kraft cardboard at around 410° F. for about 1 minute using a Tetrahedron press set at 10 tons of pressure and using 135 mil thick shims to control the amount of compression experienced by the composite material (the corrugated kraft cardboard was about 165 mils thick).

After cooling, the cardboard was pulled away from the composite material. A significant portion of the outer facing of the corrugated kraft cardboard remained bonded to the composite material, indicating that the porous polymer coating imparted excellent adhesive properties to the spunbond polyester web.

Example 5

A porous polymer coating was formed by introducing a mixture comprising a blend of low $T_g$ and high $T_g$ acrylic binders (−15° F. and +30° F., respectively), APP, thermosetting adhesive powder, foaming agents, and thickeners into a CFS® foam generator system (Gaston Systems, Inc., Stanley, N.C.) and foaming the mixture using air at around 80 pounds per square inch (psi) and a blow ratio of 4. The foam was coated onto five samples of black, flame-retardant, water-repellant spunlaced fabric comprising rayon about (50% by weight) and polyester about (50% by weight) and weighing on average 91 gsm, using a parabolic foam applicator with a 0.030" gap that was setup between the pins of a pilot line tenter frame. The coated fabric samples were dried in a forced air oven at about 150° C. for a period of time ranging from about 30 seconds to about 1 minute. Drying times were varied to allow for changes in add-on of the coating. The air permeability of the fabric samples prior to application/drying of the porous polymer coating was on average about 213 cfm.

Figure 9:
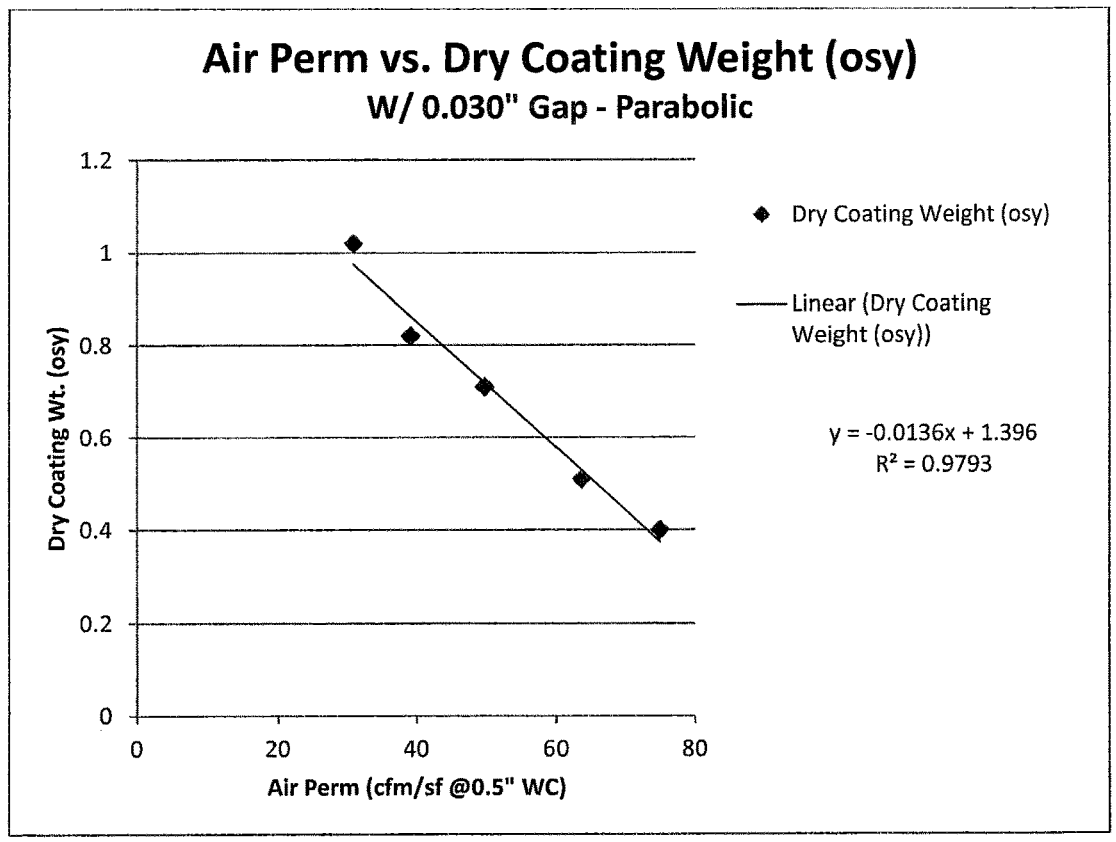
FIG. 9 is a graph comparing the air permeabilities of composite materials according to some embodiments of the present invention demonstrating that for a given formulation, fabric, and application system, the air permeability can be varied by varying the coating weight.

The dry add-on weights of the porous polymer coatings and the air permeabilities of the resultant composite materials are shown in Table 2 and in FIG. 9.

TABLE 2

Characteristics of the composite materials described in Example 5.

| Sample | Dry Add-On Weight (osy) | Avg. Air Perm (cfm) |
|---|---|---|
| Control (uncoated) | 0.0 | 213 |
| 1 | 0.4 | 75 |
| 2 | 0.5 | 64 |
| 3 | 0.7 | 50 |
| 4 | 0.8 | 39 |
| 5 | 1.0 | 31 |

Example 6

A porous polymer coating was formed by introducing UNIBOND 2780B (Unichem, Inc., Haw River, N.C.) into a CFS® foam generator system (Gaston Systems, Inc., Stanley, N.C.) and foaming the mixture using air at around 80 pounds per square inch (psi) and a blow ratio of 4. The foam was coated onto seven samples of black, flame-retardant, water-repellant spunlaced fabric comprising woodpulp (about 55% by weight) and polyester (about 45% by weight) and weighing on average about 72 gsm using a parabolic foam applicator with a 0.020" gap that was setup between the pins of a pilot line tenter frame. The coated fabric samples were dried in a forced air oven at about 150° C. for a period of time ranging from about 30 seconds to about 1 minute. The air permeability of the fabric samples prior to application/drying of the porous polymer coating was on average about 66 cfm.

Figure 10:
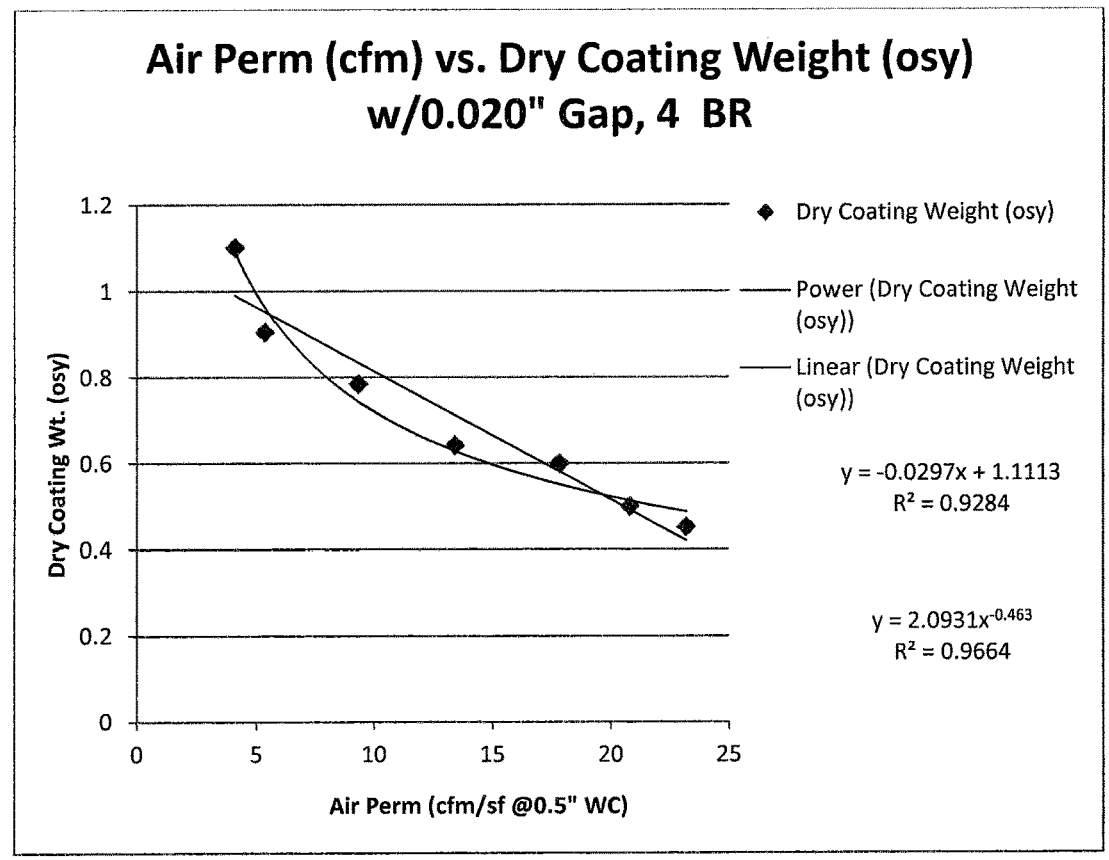
FIG. 10 is a graph similar to FIG. 9 comparing the air permeabilities of composite materials according to some embodiments of the present invention demonstrating that for a given formulation, fabric, and application system, the air permeability can be varied by varying the coating weight, such as by varying the foam applicator gap.

The dry add-on weights of the porous polymer coatings and the air permeabilities of the resultant composite materials are shown in Table 3 and in FIG. 10.

TABLE 3

Characteristics of the composite materials described in Example 6.

| Sample | Dry Add-On Weight (osy) | Avg. Air Perm (cfm) |
|---|---|---|
| Control (uncoated) | 0.0 | 66 |
| 1 | 0.45 | 23 |
| 2 | 0.5 | 21 |
| 3 | 0.6 | 18 |
| 4 | 0.65 | 13 |
| 5 | 0.79 | 9 |
| 6 | 0.9 | 5 |
| 7 | 1.1 | 4 |

Example 7

A porous polymer coating was formed by introducing UNIBOND 2780B (Unichem, Inc., Haw River, N.C.) into a CFS® foam generator system (Gaston Systems, Inc., Stanley, N.C.) and foaming the mixture using air at around 80 pounds per square inch (psi) and a blow ratio of 4. The foam was coated onto a black, flame-retardant, water-repellant spunlaced fabric comprising woodpulp (about 55% by weight) and polyester (about 45% by weight) and weighing on average about 72 gsm using a segmented foam applicator and a tenter frame. The coated fabric samples were dried in a forced air oven for about 30 seconds at about 275° F. The dry add-on weight of the porous polymer coating was on average about 0.8 ounces per square yard (osy). The air permeability of the fabric sample prior to application/drying of the porous polymer coating was on average about 66 cfm. The air permeability of the composite material was on average about 30 cfm.

Example 8

A porous polymer coating was formed by introducing UNIBOND 2780B (Unichem, Inc., Haw River, N.C.) into a CFS® foam generator system (Gaston Systems, Inc., Stanley, N.C.) and foaming the mixture using pressurized air at around 80 pounds per square inch (psi) and a blow ratio of 4. The foam was coated onto a black, flame-retardant, water-repellant spunlaced fabric comprising woodpulp (about 55% by weight) and polyester (about 45% by weight) and weighing on average about 72 gsm using a segmented foam applicator and a tenter frame. The coated fabric samples were dried in a forced air oven for about 30 seconds at about 300° F. The dry add-on weight of the porous polymer coating was approximately 0.8 ounces per square yard (osy). The air permeability of the fabric sample prior to application/drying of the porous polymer coating was on average about 66 cfm. The air permeability of the composite material was on average about 19 cfm.

Example 9

A porous polymer coating was formed by introducing a styrene acrylic copolymer mixture according to Formula 2 of Table 1 above into a CFS® foam generator system (Gaston Systems, Inc., Stanley, N.C.) and foaming the mixture using air at around 80 pounds per square inch (psi) and a blow ratio of around 10.4. The foam was coated onto a spunbond/meltblown/spunbond web comprising polypropylene (100% by weight) with a nominal basis weight around 44 gsm using a knife gap of about 40 mils. The coated web was dried in a forced air oven for 1 minute at 140° C. The dry add-on weight of the porous polymer coating was about 14.1 gsm. The air permeability of the web prior to application/drying of the porous polymer coating was about 40 cfm. The air permeability of the composite material was about 28.3 cfm.

Figure 8:
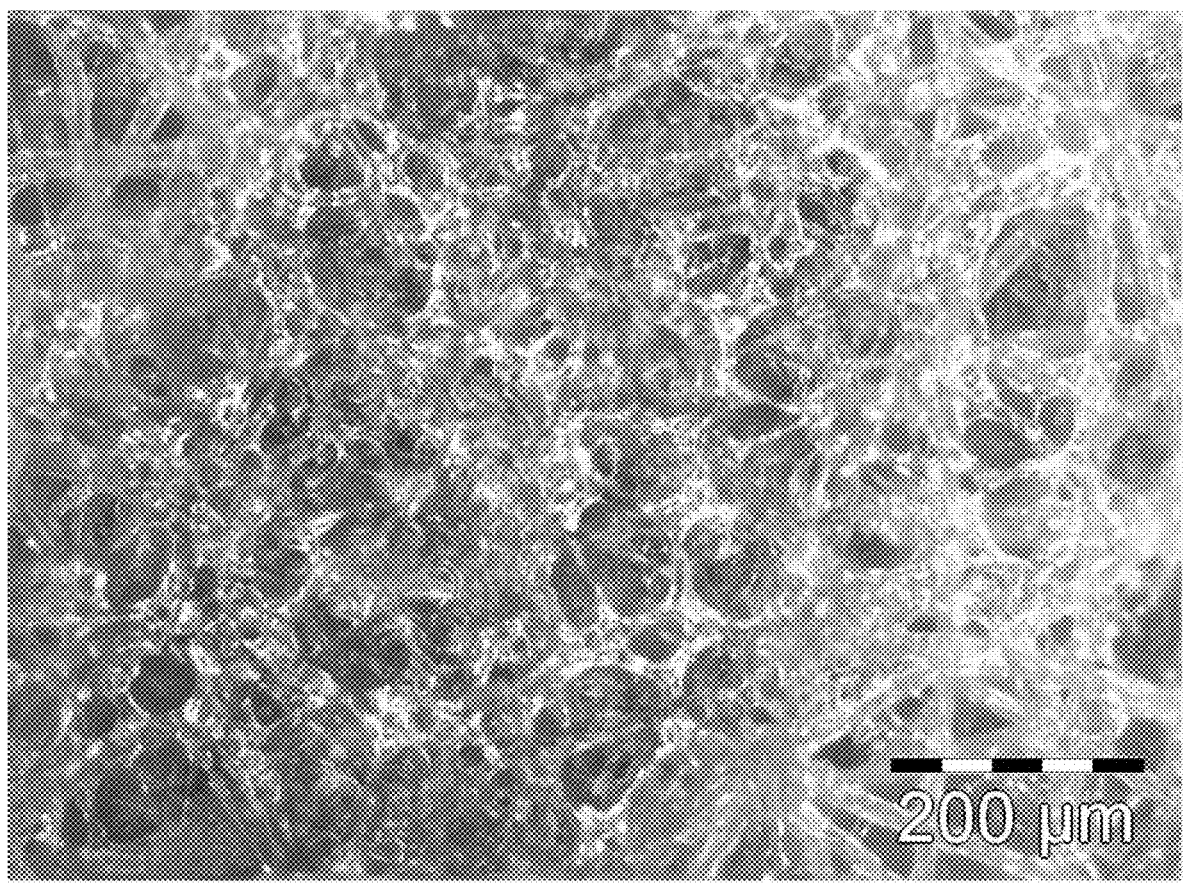
FIG. 8 is an image of the surface of a porous polymer coating according to some embodiments of the present invention. The image was acquired using a scanning electron microscope.

FIG. 8 provides an exemplary image of the porous polymer coating that was added to the polypropylene spunbond/meltblown/spunbond web.

The composite material was bonded to a 0.8 inch thick, 430 gsm nonwoven batt comprising polyester (about 80% to about 99% by weight) and a lower melt polymer (about 1% to about 20% by weight) (Vita Nonwovens, LLC, High Point, N.C.) as outlined below:

A Despatch LBB/LED Series 2400 Watt, 20 amp convection oven (Despatch Industries, Minneapolis, Minn.), which is capable of heating to a temperature of 200-400° F. and of maintaining a temperature within ±3° F. of a target temperature, was preheated to 193° F.

A 12 inch by 12 inch aluminum plate weighing 1600 grams was placed in the oven and allowed to stabilize to 193±3° F. The temperature of the aluminum plate was confirmed using a contact thermocouple (measuring the temperature of the middle of the plate and of each corner of the plate).

A 12 inch by 12 inch sample of the composite material was placed on the bench top with the porous polymer coating facing up.

The composite material sample was overlaid with a 12 inch by 12 inch piece of the nonwoven batt (ensuring that the edges of the composite material and the batt were aligned).

The composite-batt stack was placed in the oven atop the preheated aluminum plate with the nonwoven batt facing up (ensuring that the edges of the preheated aluminum plate and the composite-batt stack were aligned).

After 15 seconds, a 12 inch by 12 inch aluminum plate weighing 2400-2500 grams was placed in the oven atop the preheated aluminum plate and the composite-batt stack (ensuring that the edges of the aluminum plates and the composite-batt stack were aligned).

After 45 seconds, the top plate was removed and the composite-batt stack was removed from the oven and placed on the bench top to cool for 5 minutes.

The bond between the porous polymeric layer of the composite material and the nonwoven batt had an average peel strength of over 100 grams/inch when tested based on ASTM D903-98. ("Standard Test Method for Peel or Stripping Strength of Adhesive Bonds," ASTM International (2010)),

Example 10

A porous polymer coating was formed by introducing a styrene acrylic copolymer mixture according to Formula 3 of Table 1 above into a CFS® foam generator system (Gaston Systems, Inc., Stanley, N.C.) and foaming the mixture using air at around 80 pounds per square inch (psi) and a blow ratio of approximately 4.3. The foam was coated onto samples of a spunbond web comprising polyester (100% by weight) with a nominal basis weight of about 34 gsm using a rounded coating blade and a gap of about 15, 22 or 29 mils. The coated web was dried in a forced air oven for about 1 minute at approximately 155° C. When tested based on ASTM Standard D3776-09 ("Standard Test Methods for Mass per Unit Area (Weight) of Fabric," ASTM International (2013)), the dry add-on weights of the porous polymer coatings were around 1.40, 1.98 and 2.61 osy, respectively. The air permeability of the sampled web prior to application/drying of the porous polymer coating averaged about 711 cfm. When tested based on ASTM Standard D737-96 ("Standard Test Method for Air Permeability of Textile Fabrics," ASTM International (1996)), the air permeabilities of the composite materials were approximately 113, 52 and 15 cfm, respectively.

Figure 11:
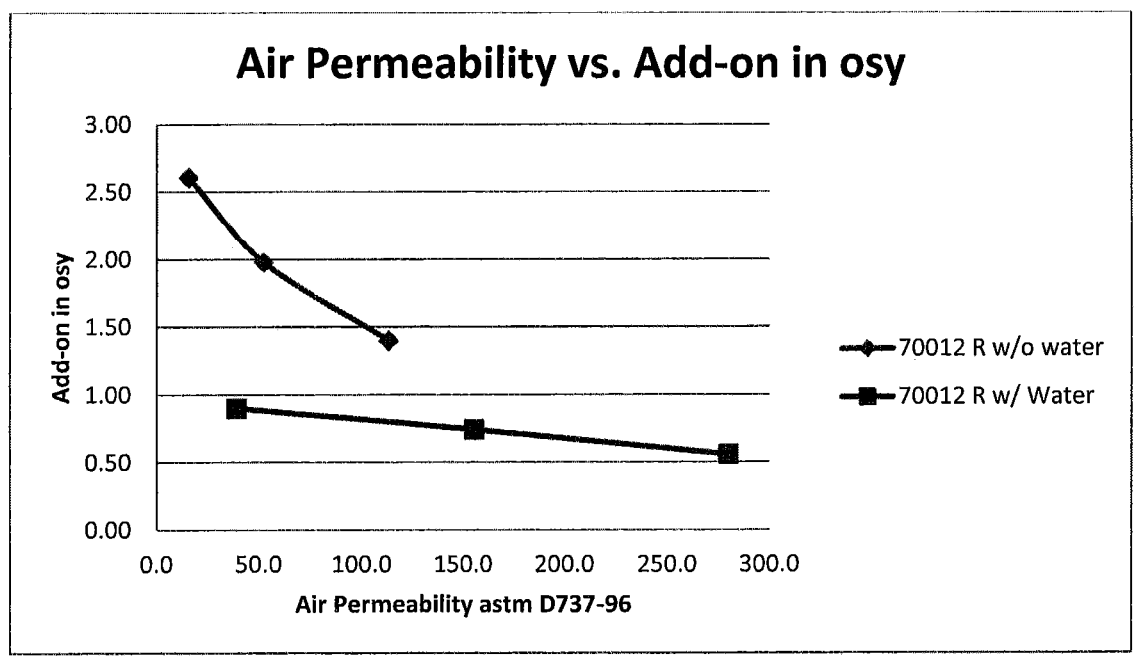
FIG. 11 is a graph showing variations of coating air permeability versus dry add-on weight resulting from compound formulation changes.

The dry add-on weights of the porous polymer coatings and the air permeabilities of the resultant composite materials are shown in Table 4 and in FIG. 11 (diamonds).

TABLE 4

Characteristics of the composite materials described in Example 10.

| Coating Gap (mil) | Dry Add-On Weight (osy) | Avg. Air Perm. (cfm) |
|---|---|---|
| 15 | 1.4 | 113.0 |
| 22 | 1.98 | 52.4 |
| 29 | 2.61 | 15.6 |

Example 11

A porous polymer coating was formed by introducing a styrene acrylic copolymer mixture according to Formula 4 of Table 1 above into a CFS® foam generator system (Gaston Systems, Inc., Stanley, N.C.) and foaming the mixture using air at around 80 pounds per square inch (psi) and a blow ratio of approximately 5. The foam was coated onto samples of a spunbond web comprising polyester (100% by weight) with a nominal basis weight of about 34 gsm using a rounded coating blade and a gap of about 15, 22 or 29 mils. The coated web was dried in a forced air oven for about 1 minute at approximately 155° C. When tested based on ASTM Standard D3776-09 ("Standard Test Methods for Mass per Unit Area (Weight) of Fabric," ASTM International (2013)), the dry add-on weights of the porous polymer coatings were around 0.56, 0.74 and 0.90 osy, respectively. The air permeability of the sampled web prior to application/drying of the porous polymer coating averaged about 711 cfm. When tested based on ASTM Standard D737-96 ("Standard Test Method for Air Permeability of Textile Fabrics," ASTM International (1996)), the air permeabilities of the composite materials were approximately 279, 155 and 39 cfm, respectively.

The dry add-on weights of the porous polymer coatings and the air permeabilities of the resultant composite materials are shown in Table 5 and in FIG. 11 (squares).

TABLE 5

Characteristics of the composite materials described in Example 11.

| Coating Gap (mil) | Dry Add-On Weight (osy) | Avg. Air Perm. (cfm) |
|---|---|---|
| 15 | 0.56 | 279.7 |
| 22 | 0.74 | 155.5 |
| 29 | 0.90 | 39.2 |

Example 12

A porous polymer coating was formed by introducing a styrene acrylic copolymer mixture according to Formula 3 of Table 1 above into a CFS® foam generator system (Gaston Systems, Inc., Stanley, N.C.) and foaming the mixture using air at around 80 pounds per square inch (psi) and a blow ratio of approximately 4.3. The foam was coated onto samples of a spunbond web comprising polyester (100% by weight) with a nominal basis weight of about 34 gsm using a rounded coating blade and a gap of about 15, 22 or 29 mils. The coated web was dried in a forced air oven for about 1 minute at approximately 155° C. When tested based on ASTM Standard D3776-09 ("Standard Test Methods for Mass per Unit Area (Weight) of Fabric," ASTM International (2013)), the dry add-on weights of the porous polymer coatings were approximately 1.40, 1.98 and 2.61 osy, respectively. The air permeability of the sampled web prior to application/drying of the porous polymer coating averaged about 711 cfm. When tested based on ASTM Standard D737-96 ("Standard Test Method for Air Permeability of Textile Fabrics," ASTM International (1996)), the air permeabilities of the composite materials were reduced by approximately 556, 616 and 653 cfm, respectively.

The dry add-on weights of the porous polymer coatings and the air permeability reductions and air permeability reduction efficiencies of the resultant composite materials are shown in Table 6.

TABLE 6

Characteristics of the composite materials described in Example 12.

| Coating Gap (mil) | Dry Add-On Weight (osy) | Avg. Air Perm. Reduction (cfm) | Avg. Air Perm. Reduction Efficiency (cfm/osy) |
|---|---|---|---|
| 15 | 1.4 | 556.0 | 397.72 |
| 22 | 1.98 | 616.6 | 311.72 |
| 29 | 2.61 | 653.4 | 250.75 |

Example 13

A porous polymer coating was formed by introducing a styrene acrylic copolymer mixture according to Formula 4 of Table 1 above into a CFS® foam generator system (Gaston Systems, Inc., Stanley, N.C.) and foaming the mixture using air at around 80 pounds per square inch (psi) and a blow ratio of approximately 5. The foam was coated onto samples of a spunbond web comprising polyester (100% by weight) with a nominal basis weight of about 34 gsm using a rounded coating blade and a gap of about 15, 22 or 29 mils. The coated web was dried in a forced air oven for about 1 minute at approximately 155° C. When tested based on ASTM Standard D3776-09 ("Standard Test Methods for Mass per Unit Area (Weight) of Fabric," ASTM International (2013)), the dry add-on weights of the porous polymer coatings were around 1.40, 1.98 and 2.61 osy, respectively. The air permeability of the sampled web prior to application/drying of the porous polymer coating averaged about 711 cfm. When tested based on ASTM Standard D737-96 ("Standard Test Method for Air Permeability of Textile Fabrics," ASTM International (1996)), the air permeabilities of the composite materials were reduced by 389.3, 513.5 and 629.8 cfm, respectively.

The dry add-on weights of the porous polymer coatings and the air permeability reductions and air permeability reduction efficiencies of the resultant composite materials are shown in Table 7.

TABLE 7

Characteristics of the composite materials described in Example 13.

| Coating Gap (mil) | Dry Add-On Weight (osy) | Avg. Air Perm Reduction (cfm) | Avg. Air Perm. Reduction Efficiency (cfm) |
|---|---|---|---|
| 15 | 0.56 | 389.3 | 697.77 |
| 22 | 0.74 | 513.5 | 692.25 |
| 29 | 0.90 | 629.8 | 699.56 |

Example 14

A porous polymer coating was formed by introducing a mixture according to Formula 1 of Table 1 above into a CFS® foam generator system (Gaston Systems, Inc., Stanley, N.C.) and foaming the mixture using air at around 80 pounds per square inch (psi) and a blow ratio of approximately 4.3. The foam was coated onto samples of a spunbond web comprising polyester (100% by weight) and weighing 34 gsm using a rounded coating blade and a gap of about 15, 22 or 29 mils. The coated web was dried in a forced air oven for about 1 minute at approximately 155° C. When tested based on ASTM Standard D3776-09 ("Standard Test Methods for Mass per Unit Area (Weight) of Fabric," ASTM International (2013)), the dry add-on weights of the porous polymer coatings were around 1.40, 1.98 and 2.61 osy, respectively.

Figure 12:
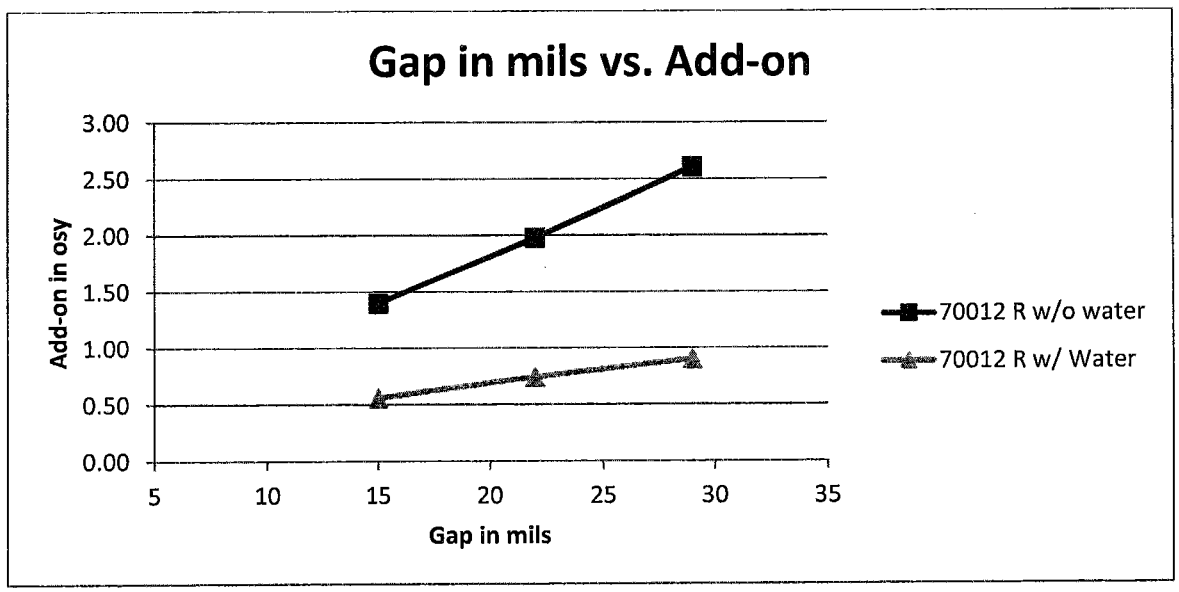
FIG. 12 is a graph comparing the dry add-on weights of porous polymer coatings in composite materials according to some embodiments of the present invention with the coating gaps used to form those composite materials.

The dry add-on weights of the porous polymer coatings are shown in Table 8 and in FIG. 12 (squares).

TABLE 8

Characteristics of the composite materials described in Example 14.

| Coating Gap (mil) | Dry Add-On Weight (osy) |
| --- | --- |
| 15 | 1.40 |
| 22 | 1.98 |
| 29 | 2.61 |

A 12 inch by 12 inch sample of the composite material was bonded to a 12 inch by 12 inch piece of corrugated kraft cardboard at 430° F. for in minute using 5 tons of pressure and 135 mil thick shims to control the amount of compression experienced by the composite material (the corrugated kraft cardboard was about 165 mils thick). This was done using a Tetrahedron press, model number 1301 (from Tetrahedron Associates, Inc., San Diego, Calif.) according to the manufacturer's instructions.

After cooling, the cardboard was pulled away from the composite material. A significant portion of the outer facing of the corrugated kraft cardboard remained bonded to the composite material, indicating that the porous polymer coating imparted excellent adhesive properties to the spunbond polyester web.

Example 15

A porous polymer coating was formed by introducing a styrene acrylic copolymer mixture according to Formula 2 of Table 1 above into a CFS® foam generator system (Gaston Systems, Inc., Stanley, N.C.) and foaming the mixture using air at around 80 pounds per square inch (psi) and a blow ratio of approximately 3.3. The foam was coated onto samples of a spunbond web comprising polyester (100% by weight) with a nominal basis weight of about 34 gsm using a rounded coating blade and a gap of about 15, 22 or 29 mils. The coated web was dried in a forced air oven for about 1 minute at approximately 155° C. When tested based on ASTM Standard D3776-09 ("Standard Test Methods for Mass per Unit Area (Weight) of Fabric," ASTM International (2013)), the dry add-on weights of the porous polymer coatings were around 0.56, 0.74 and 0.90 osy, respectively.

The dry add-on weights of the porous polymer coatings are shown in Table 9 and in FIG. 12 (triangles).

TABLE 9

Characteristics of the composite materials described in Example 15.

| Coating Gap (mil) | Dry Add-On Weight (osy) |
| --- | --- |
| 15 | 0.56 |
| 22 | 0.74 |
| 29 | 0.90 |

A 12 inch by 12 inch sample of the composite material was bonded to a 12 inch by 12 inch piece of corrugated kraft cardboard at 410° F. for in minute using 10 tons of pressure and 135 mil thick shims to control the amount of compression experienced by the composite material (the corrugated kraft cardboard was about 165 mils thick).

After cooling, the cardboard was pulled away from the composite material. A significant portion of the outer facing of the corrugated kraft cardboard remained bonded to the composite material, indicating that the porous polymer coating imparted excellent adhesive properties to the spunbond polyester web.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed:

1. A porous polymer coating comprising:
 a polymeric foam having thermally activated adhesive properties, a void fraction of greater than about 15%, and an air permeability greater than 3 cubic feet per minute per square foot (cfm/sq. ft.) as measured based on ASTM D737-04,
 wherein said polymeric foam comprises a plurality of open cells;
 wherein said polymeric foam comprises a copolyester thermoset and at least one thermoplastic polymer, wherein the at least one thermoplastic polymer is a polyacrylate; and
 wherein said porous polymer coating has an airflow resistance in a range of about 200 Rayls to about 2,500 Rayls as measured based on ASTM C522-03.

2. The porous polymer coating of claim 1, wherein said polymeric foam further comprises at least one additional thermoplastic polymers and the at least one additional thermoplastic polymer is selected from the group consisting of: polyacrylates, polyvinylacetates, styrene butadiene rubbers, diallylorthophthalates, ionomers, formulated epoxys, polysulfones, polyether-etherketones, acrylonitrilebutadienstyrenes, polycarbonates, vinylesters, styrene copolymers, polyamides, polyamines, ethylenevinylacetates, polyvinylalcohols, polyvinylchlorides, polyvinylidiene chloride, chlorinated polyethylenes, polyesters, nitriles, and polyethylenes.

3. The porous polymer coating of claim 1, wherein said polymeric foam further comprises one or more non-thermoplastic polymers.

4. The porous polymer coating of claim 1, wherein said polymeric foam further comprises one or more additional thermoset polymers.

5. The porous polymer coating of claim 1, wherein said porous polymer coating further comprises one or more latex binders.

6. The porous polymer coating of claim 1, wherein said airflow resistance is in a range of about 500 Rayls to about 1,000 Rayls as measured based on ASTM C522-03.

7. The porous polymer coating of claim 1, having an air permeability of greater than about 22 cubic feet per minute per square foot as measured based on ASTM D737-04.

8. The porous polymer coating of claim 1, having an air permeability of greater than about 40 cubic feet per minute per square foot as measured based on ASTM D737-04.

9. The porous polymer coating of claim 1, having an air permeability of greater than about 73 cubic feet per minute per square foot as measured based on ASTM D737-04.

10. The porous polymer coating of claim 1, having a basis weight of about 10 grams per square meter to about 75 grams per square meter.

11. The porous polymer coating of claim 1, having a basis weight of about 10 grams per square meter to about 45 grams per square meter.

12. The porous polymer coating of claim 1, wherein the polymeric foam is a reticulated polymeric foam.

13. The porous polymer coating of claim 1, further comprising thermally activatable adhesive particles.

14. The porous polymer coating of claim 1, further comprising a filled latex polymer coating.

15. The porous polymer coating of claim 1, further comprising an additive containing latex polymer coating.

16. The porous polymer coating of claim 1, wherein said polymeric foam has a blow ratio of about 3 to about 10.

17. The porous polymer coating of claim 1, further comprising a styrene copolymer.

18. The porous polymer coating of claim 1, wherein said air permeability is in a range of about 5 cfm/sq. ft. to about 100 cfm/sq. ft. as measured based on ASTM D737-04.

19. The porous polymer coating of claim 1, wherein the void fraction is in a range of about 20% to about 50%.

20. A composite material, comprising:
a first substrate;
a second substrate; and
the porous polymer coating of claim 1 interposed between said first substrate and second substrate.

21. The composite material of claim 20, wherein said composite material has increased air flow resistance as compared to a control material that lacks a porous polymer coating but is otherwise identical to the composite material.

22. The composite material of claim 20, wherein said first substrate comprises a nonwoven or spunlaced fabric.

23. The composite material of claim 20, wherein said second substrate comprises a glass/resin batt.

24. The composite material of claim 20, having an airflow resistance in a range of about 200 Rayls to about 2,500 Rayls as measured based on ASTM C522-03.

25. The composite material of claim 20, having an airflow resistance in a range of about 500 Rayls to about 1,000 Rayls as measured based on ASTM C522-03.

26. The composite material of claim 20, having an air permeability of from about 3 cubic feet per minute per square foot to about 22 cubic feet per minute per square foot as measured based on ASTM D737-04.

27. The composite material of claim 20, having an air permeability of from about 22 cubic feet per minute per square foot to about 40 cubic feet per minute per square foot as measured based on ASTM D737-04.

28. The composite material of claim 20, having an air permeability of from about 40 cubic feet per minute per square foot to about 73 cubic feet per minute per square foot as measured based on ASTM D737-04.

29. The composite material of claim 20, having an air permeability of greater than about 73 cubic feet per minute per square foot as measured based on ASTM D737-04.

30. A method of forming a composite material, comprising:
applying the porous polymer coating of claim 1 to a substrate.

31. The method of claim 30, wherein said substrate is a nonwoven fabric.

32. The method of claim 30, wherein said substrate is a spunlaced fabric.

33. The method of claim 30, wherein said composite material has an airflow resistance in a range of about 200 Rayls to about 2,500 Rayls as measured based on ASTM C522-03.

34. The method of claim 30, wherein said composite material has an airflow resistance in a range of about 500 Rayls to about 1,000 Rayls as measured based on ASTM C522-03.

35. The method of claim 30, wherein said composite material has an air permeability of greater than about 3 cubic feet per minute per square foot as measured based on ASTM D737-04.

36. The method of claim 30, wherein said composite material has an air permeability of greater than about 22 cubic feet per minute per square foot as measured based on ASTM D737-04.

37. A porous polymer coating comprising:
a polymeric foam having thermally activated adhesive properties, a void fraction of greater than about 15%, and an air permeability greater than 3 cubic feet per minute per square foot (cfm/sq. ft.) as measured based on ASTM D737-04,
wherein said polymeric foam comprises a plurality of open cells;
wherein said polymeric foam comprises clay and a thermoplastic polymer;
wherein said thermoplastic polymer comprises a polyacrylate and a polyvinylchloride polymer; and
wherein said porous polymer coating has an airflow resistance in a range of about 200 Rayls to about 2,500 Rayls as measured based on ASTM C522-03.

38. The porous polymer coating of claim 37, wherein said porous polymer coating has an airflow resistance in a range of about 500 Rayls to about 1,000 Rayls as measured based on ASTM C522-03.

39. The porous polymer coating of claim 37, wherein said air permeability is in a range of about 5 cfm/sq. ft. to about 100 cfm/sq. ft. as measured based on ASTM D737-04.

40. The porous polymer coating of claim 37, wherein the void fraction is in a range of about 20% to about 50%.

* * * * *